United States Patent
Hong et al.

(10) Patent No.: US 10,289,849 B2
(45) Date of Patent: *May 14, 2019

(54) ELECTRONIC SYSTEM HAVING INTEGRITY VERIFICATION DEVICE

(71) Applicant: SAMSUNG ELECTRONICS CO., LTD., Suwon-si (KR)

(72) Inventors: Tong-Pyo Hong, Suwon-si (KR); Kyung-Ae Kim, Seoul (KR); Jae-Chul Park, Seoul (KR); Yun-Ho Youm, Seoul (KR); Heon-Soo Lee, Hwaseong-si (KR); Hye-Soo Lee, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/636,814

(22) Filed: Jun. 29, 2017

(65) Prior Publication Data

US 2017/0308703 A1    Oct. 26, 2017

Related U.S. Application Data

(63) Continuation of application No. 14/638,862, filed on Mar. 4, 2015, now Pat. No. 9,703,960.

(30) Foreign Application Priority Data

Mar. 7, 2014    (KR) .................. 10-2014-0026914

(51) Int. Cl.
*G06F 21/57* (2013.01)
*G06F 21/64* (2013.01)
*G06F 21/79* (2013.01)

(52) U.S. Cl.
CPC ............. *G06F 21/57* (2013.01); *G06F 21/64* (2013.01); *G06F 21/79* (2013.01); *G06F 2221/034* (2013.01); *G06F 2221/2139* (2013.01)

(58) Field of Classification Search
CPC .......... G06F 21/57; G06F 21/79; G06F 21/64; G06F 2221/034; G06F 2221/2139; G06F 21/554; G06F 9/4401; H04L 9/3247
See application file for complete search history.

(56) References Cited

U.S. PATENT DOCUMENTS

| 6,564,326 | B2 | 5/2003 | Helbig, Sr. |
| 7,536,540 | B2 | 5/2009 | Holtzman et al. |

(Continued)

FOREIGN PATENT DOCUMENTS

| JP | 4093494 B2 | 6/2008 |
| JP | 4501349 B2 | 7/2010 |

(Continued)

OTHER PUBLICATIONS

Notice of Allowance issued in parent U.S. Appl. No. 14/638,862 dated Mar. 10, 2017.

*Primary Examiner* — Amir Mehrmanesh
(74) *Attorney, Agent, or Firm* — Sughrue Mion, PLLC

(57) ABSTRACT

Provided are an electronic system, an integrity verification device, and a method of performing an integrity verification operation. The electronic system includes: a memory device; a processor configured to provide a plurality of configuration records corresponding to a plurality of verification data stored in the memory device, each of the configuration records including a start address, a data length, and a reference hash value for a corresponding verification data; and an integrity verification device configured to: store the configuration records, select a configuration record, directly access the memory device to read verification data, corre- (Continued)

sponding to the selected configuration record, based on the start address and the data length included in the selected configuration record, perform a hash operation on the verification data to obtain a verification hash value, and output an interrupt signal based on the verification hash value and the reference hash value comprised in the selected configuration record.

16 Claims, 21 Drawing Sheets

(56) References Cited

U.S. PATENT DOCUMENTS

| | | |
|---|---|---|
| 7,725,703 B2 | 5/2010 | Hunter et al. |
| 7,841,010 B2 | 11/2010 | Lerouge et al. |
| 8,347,116 B2 | 1/2013 | Youm et al. |
| 8,433,923 B2 | 4/2013 | Yasaki et al. |
| 8,474,021 B2 | 6/2013 | Hearn et al. |
| 2006/0047955 A1 | 3/2006 | Prevost et al. |
| 2009/0327718 A1 | 12/2009 | Hirai |
| 2010/0169967 A1 | 7/2010 | Khosravi et al. |
| 2012/0054365 A1 | 3/2012 | Wu |
| 2013/0124845 A1 | 5/2013 | Wang |
| 2014/0244785 A1 | 8/2014 | Potlapally et al. |
| 2014/0245425 A1 | 8/2014 | Potlapally et al. |

FOREIGN PATENT DOCUMENTS

| | | |
|---|---|---|
| JP | 4676696 B2 | 4/2011 |
| JP | 4769608 B2 | 9/2011 |
| JP | 5198422 B2 | 5/2013 |
| KR | 10-2007-0071983 A | 7/2007 |

| NO. | EN_F | SADDR_F | LENG_F | HTYPE_F |
|---|---|---|---|---|
| 1 | H | SADDR1 | LENG1 | HTYPE1(SHA-1) |
| 2 | H | SADDR2 | LENG2 | HTYPE2(SHA-1) |
| ⋮ | ⋮ | ⋮ | ⋮ | ⋮ |
| n | H | SADDRn | LENGn | HTYPEn(SHA-256) |

| NO. | RHASH |
|---|---|
| 1 | RHASH1 (160bit) |
| 2 | RHASH2 (160bit) |
| ⋮ | ⋮ |
| n | RHASHn (256bit) |

ELECTRONIC SYSTEM HAVING INTEGRITY VERIFICATION DEVICE

CROSS-REFERENCE TO RELATED APPLICATION

This is a continuation of U.S. application Ser. No. 14/638,862 filed Mar. 4, 2015, which claims priority from Korean Patent Application No. 10-2014-0026914, filed on Mar. 7, 2014 in the Korean Intellectual Property Office (KIPO), the contents of which are herein incorporated by reference in their entirety.

BACKGROUND

1. Technical Field

Apparatuses and methods consistent with exemplary embodiments relate to technology for data security, and more particularly to an electronic system including an integrity verification device.

2. Description of the Related Art

Recently, an electronic system, such as a mobile device, performs various types of operations using sensitive data such as personal information, a cryptographic key, etc.

Therefore, the electronic system may detect whether memory areas storing the sensitive data are attacked such that the sensitive data is changed.

If the electronic system detects whether the sensitive data is changed using software, a central processing unit (CPU) load increases such that performance of the electronic system is degraded and power consumption of the electronic system increases.

SUMMARY

Aspects of one or more exemplary embodiments provide an electronic system that effectively detects whether sensitive data loaded on a memory device is changed using an integrity verification device that is implemented as a hardware device.

According to an aspect of an exemplary embodiment, there is provided an electronic system including: a memory device configured to store a plurality of verification data; a processor configured to provide a plurality of configuration records respectively corresponding to the plurality of verification data, each of the plurality of configuration records comprising a start address, a data length, and a reference hash value for a corresponding verification data; and an integrity verification device configured to: store the plurality of configuration records provided by the processor, select a configuration record among the plurality of configuration records, directly accesses the memory device to read verification data, which corresponds to the selected configuration record, from among the plurality of verification data stored in the memory device based on the start address and the data length included in the selected configuration record, perform a hash operation on the read verification data to obtain a verification hash value, and selectively output an interrupt signal based on the obtained verification hash value and the reference hash value included in the selected configuration record.

The integrity verification device may include a controller configured to store the plurality of configuration records, select the configuration record, and output the start address and the data length included in the selected configuration record, a first-input first-output (FIFO) memory, a direct memory accessor (DMA) configured to read, from the memory device, the verification data, which corresponds to the start address and the data length output by the controller, and to store the read verification data in the FIFO memory unit, and a hash engine configured to perform the hash operation on the stored verification data, which is stored in the FIFO memory, based on the data length output by the controller to obtain the verification hash value, wherein the controller may output the interrupt signal in response to the verification hash value being different from the reference hash value included in the selected configuration record.

The processor may perform, on each of the plurality of verification data, a hash operation, from among a plurality of predetermined hash operations, to obtain a corresponding reference hash value, each of the plurality of configuration records may further include hash type information indicating a type of a hash operation performed to obtain the corresponding reference hash value, the controller may provide the hash type information included in the selected configuration record to the hash engine, the hash engine may perform the hash operation, which corresponds to the hash type information received from the controller, on the corresponding verification data to obtain the verification hash value.

The integrity verification device may further include a timer configured to output a read start signal at every threshold time interval, wherein in response to receiving the read start signal from the timer, the DMA may perform a burst read operation on the memory device to read the verification data from the memory device.

The processor may provide a value of the threshold time interval to the controller, and the controller may provide, to the timer, the value of the threshold time interval provided by the processor.

According to an aspect of another exemplary embodiment, there is provided an electronic system including: a memory device configured to store a plurality of verification data; a processor configured to: obtain a descriptor table comprising a plurality of configuration records respectively corresponding to the plurality of verification data, each of the plurality of configuration records comprising a start address, a data length, and a reference hash value for a corresponding verification data, store the descriptor table in the memory device, and provide a descriptor record comprising a descriptor start address, a descriptor length, and a descriptor reference hash value corresponding to the descriptor table; and an integrity verification device configured to: store the descriptor record provided by the processor, perform an integrity verification operation on the descriptor table by directly accessing the memory device to read the descriptor table from the memory device based on the descriptor start address and the descriptor length comprised in the descriptor record, performing a hash operation on the descriptor table to obtain a descriptor verification hash value, and comparing the descriptor verification hash value with the descriptor reference hash value comprised in the descriptor record, and in response to the descriptor verification hash value being the same as the descriptor reference hash value comprised in the descriptor record, perform an integrity verification operation on the plurality of verification data, which are stored in the memory device, based on the plurality of configuration records comprised in the descriptor table to selectively output an interrupt signal.

In response to the descriptor verification hash value being different from the descriptor reference hash value included in the descriptor record, the integrity verification device may output the interrupt signal.

In response to the descriptor verification hash value being the same as the descriptor reference hash value included in the descriptor record, the integrity verification device may select a configuration record among the plurality of configuration records included in the descriptor table, directly access the memory device to read verification data, which corresponds to the selected configuration record, from among the plurality of verification data stored in the memory device based on the start address and the data length included in the selected configuration record, perform a hash operation on the read verification data to obtain a verification hash value, and output an interrupt signal in response to the obtained verification hash value being different from the reference hash value included in the selected configuration record.

The integrity verification device may include: a controller configured to store the descriptor record, and output the descriptor start address and the descriptor length included in the descriptor record; a first-input first-output (FIFO) memory; a direct memory accessor (DMA) configured to read the descriptor table from the memory device based on the descriptor start address and the descriptor length output by the controller, and provide the read descriptor table to the FIFO memory and the controller; and a hash engine configured to perform the hash operation on the descriptor table, which is stored in the FIFO memory, based on the descriptor length output by the controller to obtain the descriptor verification hash value, wherein the controller may output the interrupt signal in response to the obtained descriptor verification hash value being different from the descriptor reference hash value included in the descriptor record.

The processor may perform, on the descriptor table, a hash operation, from among a plurality of predetermined hash operations, to obtain the descriptor reference hash value, the descriptor record may further include descriptor hash type information indicating a type of a hash operation performed to obtain the descriptor reference hash value, the controller may provide the descriptor hash type information included in the descriptor record to the hash engine, and the hash engine may perform the hash operation, which corresponds to the descriptor hash type information provided by the controller, on the descriptor table to obtain the descriptor verification hash value.

In response to the descriptor verification hash value being the same as the descriptor reference hash value included in the descriptor record, the controller may select a configuration record among the plurality of configuration records included in the descriptor table, and output the start address and the data length included in the selected configuration record, the DMA may read verification data, which corresponds to the start address and the data length output by the controller, from among the plurality of verification data stored in the memory device, and store the verification data, which is read from the memory device, in the FIFO memory, the hash engine may perform a hash operation on the verification data, which is stored in the FIFO memory, based on the data length output by the controller to obtain a verification hash value, and the controller may output the interrupt signal in response to the verification hash value being different from the reference hash value included in the selected configuration record.

In response to the verification hash value being the same as the reference hash value included in the selected configuration record, the integrity verification device may perform the integrity verification operation again on the descriptor table, and in response to the descriptor verification hash value being the same as the descriptor reference hash value included in the descriptor record according to the integrity verification operation performed again on the descriptor table, the integrity verification device may select another configuration record from among the plurality of configuration records included in the descriptor table, and perform the integrity verification operation on verification data, which correspond to the selected other configuration record, among the plurality of verification data stored in the memory device.

The verification data may include first through m-th block verification data distributed in the memory device, where m is an integer equal to or greater than two, and the start address included in the selected configuration record may include first through m-th start addresses corresponding to the first through m-th block verification data, respectively, and the data length included in the selected configuration record may include first through m-th data lengths corresponding to the first through m-th block verification data, respectively.

The controller may successively output each of the first through m-th start addresses and each of the first through m-th data lengths, which are included in the selected configuration record, in pairs, the DMA may successively read the first through m-th block verification data, which correspond to pairs of the first through m-th start addresses and the first through m-th data lengths, respectively, from the memory device, and store the first through m-th block verification data, which are read from the memory device, in the FIFO memory, and the hash engine may successively read the first through m-th block verification data from the FIFO memory and successively perform the hash operation on the first through m-th block verification data based on the first through m-th start addresses, respectively, to obtain the verification hash value.

The integrity verification device may further include a timer configured to output a read start signal at every threshold time interval, wherein in response to receiving the read start signal from the timer, the DMA may perform a burst read operation on the memory device to read the verification data from the memory device.

The processor may provide a value of the threshold time interval to the controller, and the controller may provide, to the timer, the value of the threshold time interval provided by the processor.

According to an aspect of another exemplary embodiment, there is provided an integrity verification device for an electronic system, the integrity verification device including: a controller configured to obtain a configuration record from among a plurality of configuration records, the plurality of configuration records respectively corresponding to a plurality of verification data stored in a memory device of the electronic system, and each of the plurality of configuration records including a start address, a data length, and a reference hash value for a corresponding verification data; a direct memory accessor (DMA) configured to directly access the memory device to read verification data, which corresponds to the obtained configuration record, from among the plurality of verification data stored in the memory device based on the start address and the data length included in the obtained configuration record; and a hash engine configured to perform a hash operation on the read verification data to obtain a verification hash value, wherein the controller is configured to selectively output an interrupt signal to a processor of the electronic system based on the obtained verification hash value and the reference hash value included in the obtained configuration record.

The controller may be configured to store the plurality of configuration records received from the processor.

The controller may be configured to store a descriptor record received from the processor, the descriptor record may correspond to a descriptor table including the plurality of configuration records, the descriptor table is stored in the memory device, and the descriptor record may include a descriptor start address, a descriptor length, and a descriptor reference hash value corresponding to the descriptor table. [26] The DMA may be configured to read the descriptor table from the memory device based on the descriptor start address and the descriptor length included in the descriptor record, the hash engine may be configured to perform a hash operation on the descriptor table based on the descriptor length to obtain a descriptor verification hash value, and the controller may be configured to output an interrupt signal in response to the obtained descriptor hash value being different from the descriptor reference hash value included in the descriptor record.

The descriptor record may further include descriptor hash type information indicating a type of a hash operation performed to obtain the descriptor reference hash value, the controller may be configured to provide the descriptor hash type information included in the descriptor record to the hash engine, and the hash engine may perform the hash operation, which corresponds to the descriptor hash type information provided by the controller, on the descriptor table to obtain the descriptor verification hash value.

The controller may be configured to select, in response to the descriptor verification hash value being the same as the descriptor reference hash value included in the descriptor record, the configuration record and output the start address and the data length included in the selected configuration record.

The verification data may include first through m-th block verification data distributed in the memory device, where m is an integer equal to or greater than two, and the start address included in the selected configuration record may include first through m-th start addresses corresponding to the first through m-th block verification data, respectively, and the data length included in the selected configuration record may include first through m-th data lengths corresponding to the first through m-th block verification data, respectively.

The integrity verification device may further include: a first-input first-output (FIFO) memory, wherein the controller may be configured to successively output each of the first through m-th start addresses and each of the first through m-th data lengths, which are included in the selected configuration record, in pairs, wherein the DMA may successively read the first through m-th block verification data, which correspond to pairs of the first through m-th start addresses and the first through m-th data lengths, respectively, from the memory device, and may store the first through m-th block verification data, which are read from the memory device, in the FIFO memory, and wherein the hash engine may obtain a first interim hash value based on the first block verification data and the first data length, may obtain a p-th interim hash value based on the p-th block verification data, the first through p-th data lengths and the (p−1)-th interim hash value, and may obtain the verification hash value based on the m-th block verification data, the first through m-th data lengths, and the (m−1)-th interim hash value, where p is a positive integer less than m.

Each of the plurality of configuration records may further include hash type information indicating a type of a hash operation performed to obtain the corresponding reference hash value; the controller may provide the hash type information included in the obtained configuration record to the hash engine; and the hash engine may perform the hash operation, which corresponds to the hash type information received from the controller, on the corresponding verification data to obtain the verification hash value.

The integrity verification device may further include a timer configured to output a read start signal at every threshold time interval, wherein, in response to receiving the read start signal from the timer, the DMA may perform a burst read operation on the memory device to read the verification data from the memory device.

The controller may provide, to the timer, a value of the threshold time interval received from the processor.

According to an aspect of another exemplary embodiment, there is provided a method of performing an integrity verification operation by an integrity verification device of an electronic system including the integrity verification device, a memory device, and a processor, the method including: obtaining, by the integrity verification device, a configuration record from among a plurality of configuration records, the plurality of configuration records respectively corresponding to a plurality of verification data stored in the memory device, and each of the plurality of configuration records including a start address, a data length, and a reference hash value for a corresponding verification data; directly accessing, by the integrity verification device, the memory device to read verification data, which corresponds to the obtained configuration record, from among the plurality of verification data stored in the memory device based on the start address and the data length included in the obtained configuration record; performing, by the integrity verification device, a hash operation on the read verification data to obtain a verification hash value; and selectively outputting, by the integrity verification device, an interrupt signal to the processor based on the obtained verification hash value and the reference hash value included in the obtained configuration record.

The method may further include storing, by the integrity verification device, a plurality of configuration records received from the processor.

The method may further include: storing, by the integrity verification device, a descriptor record received from the processor, wherein the descriptor record may correspond to a descriptor table including the plurality of configuration records, wherein the descriptor table may be stored in the memory device, and wherein the descriptor record may include a descriptor start address, a descriptor length, and a descriptor reference has value corresponding to the descriptor table.

The method may further include: reading, by the integrity verification device, the descriptor table from the memory device based on the descriptor start address and the descriptor length included in the descriptor record; performing, by the integrity verification device, a hash operation on the descriptor table based on the descriptor length to obtain a descriptor verification hash value; and outputting, by the integrity verification device, an interrupt signal in response to the obtained descriptor hash value being different from the descriptor reference hash value included in the descriptor record.

BRIEF DESCRIPTION OF THE DRAWINGS

Illustrative, non-limiting exemplary embodiments will be more clearly understood from the following detailed description in conjunction with the accompanying drawings.

FIG. 4 is a diagram illustrating an example of a configuration table included in a control unit of FIG. 3;

FIG. 5 is a diagram illustrating an example of a hash register included in a control unit of FIG. 3;

DETAILED DESCRIPTION OF EXEMPLARY EMBODIMENTS

Figure 1:
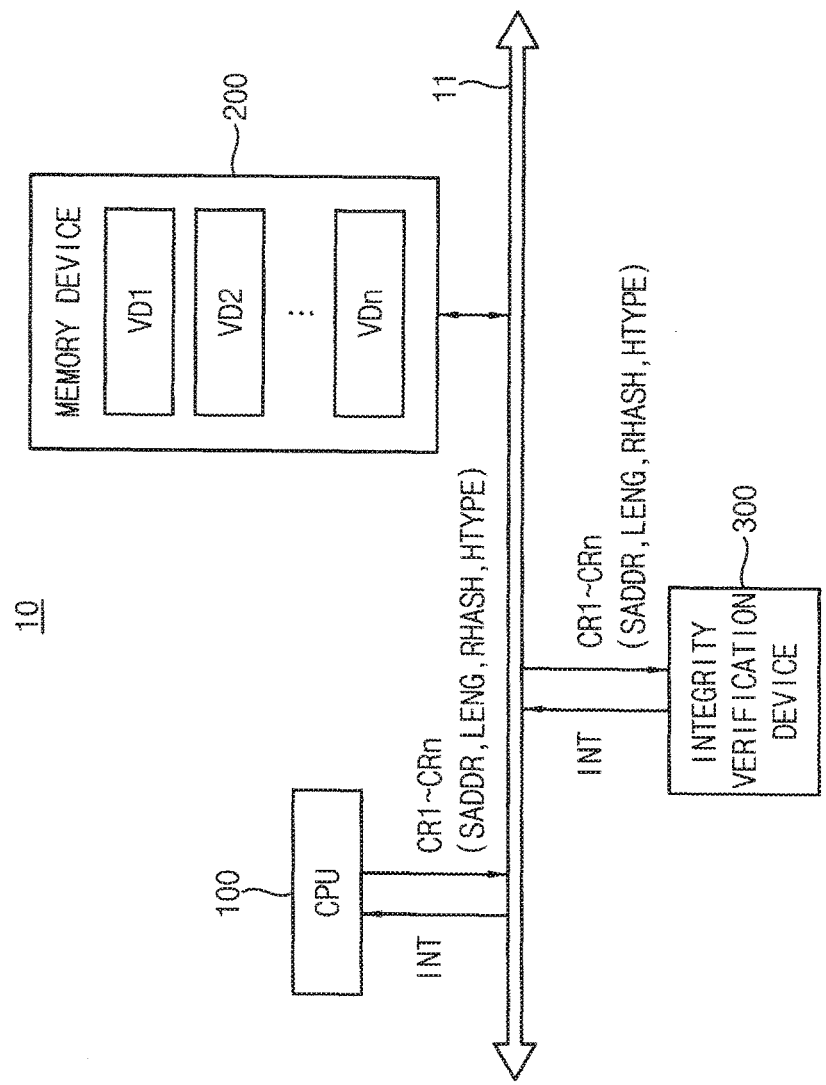
FIG. 1 is a block diagram illustrating an electronic system according to an exemplary embodiment.

Various exemplary embodiments will be described more fully with reference to the accompanying drawings, in which some exemplary embodiments are shown. An exemplary embodiment may, however, be embodied in many different forms and should not be construed as limited to exemplary embodiments set forth herein. Rather, these exemplary embodiments are provided so that this disclosure will be thorough and complete, and will fully convey the scope of the present inventive concept to those skilled in the art Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present inventive concept. As used herein, the term "and/or" includes any and all combinations of one or more of the associated listed items. Furthermore, expressions such as "at least one of," when preceding a list of elements, modify the entire list of elements and do not modify the individual elements of the list.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the inventive concept. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which exemplary embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating an electronic system 10 according to an exemplary embodiment.

Referring to FIG. 1, an electronic system 10 includes a processor (in the present exemplary embodiment, a central processing unit (CPU) 100), a memory device 200, and an integrity verification device 300.

The CPU 100, the memory device 200, and the integrity verification device 300 communicate with each other via an internal bus 11.

The memory device 200 may include a memory controller to communicate data with the CPU 100 and the integrity verification device 300.

The memory device 200 stores a plurality of verification data VD1, VD2, . . . , VDn. Here, n represents a positive integer. In one or more exemplary embodiments, each of the plurality of verification data VD1, VD2, . . . , VDn may be sensitive data, such as personal information, a cryptographic key, etc. However, it is understood that one or more other exemplary embodiments are not limited thereto. For example, according to another exemplary embodiment, each of the plurality of verification data VD1, VD2, . . . , VDn may be executable codes of application software.

In one or more exemplary embodiments, the plurality of verification data VD1, VD2, . . . , VDn may be loaded (e.g., stored) on the memory device 200 by the CPU 100.

Furthermore, in one or more exemplary embodiments, the memory device 200 may be a dynamic random access memory (DRAM), such as a double data rate synchronous dynamic random access memory (DDR SDRAM), a low power double data rate synchronous dynamic random access memory (LPDDR SDRAM), a graphics double data rate synchronous dynamic random access memory (GDDR SDRAM), a Rambus dynamic random access memory (RDRAM), etc., or may be other volatile memory devices.

The CPU 100 performs a hash operation on each of the plurality of verification data VD1, VD2, . . . , VDn, which are stored in the memory device 200, to generate a reference hash value RHASH for each of the plurality of verification data VD1, VD2, . . . , VDn. The CPU 100 generates a start address SADDR for each of the plurality of verification data VD1, VD2, . . . , VDn that indicates a location of each of the plurality of verification data VD1, VD2, . . . , VDn on the memory device 200. The CPU 100 generates a data length LENG for each of the plurality of verification data VD1, VD2, . . . , VDn that indicates a size of each of the plurality of verification data VD1, VD2, . . . , VDn. The CPU 100 generates a plurality of configuration records CR1~CRn including the start address SADDR, the data length LENG and the reference hash value RHASH corresponding to each of the plurality of verification data VD1, VD2, . . . , VDn. The CPU 100 provides the plurality of configuration records CR1~CRn to the integrity verification device 300.

The integrity verification device 300 internally stores the plurality of configuration records CR1~CRn received from the CPU 100. The integrity verification device 300 selects (e.g., alternately, successively, or circularly selects) each of the plurality of configuration records CR1~CRn. For example, the integrity verification device 300 may circularly select the plurality of configuration records CR1~CRn one at a time in an order from the first configuration record CR1 to the n-th configuration record CRn.

The integrity verification device 300 directly accesses the memory device 200 without intervention of the CPU 100 and reads verification data VDk, which corresponds to the selected configuration record CRk, from the memory device 200 based on the start address SADDR and the data length LENG included in the selected configuration record CRk. Here, k represents a positive integer less than or equal to n.

The integrity verification device 300 performs a hash operation on the verification data VDk, which is read from the memory device 200, using a hardware engine to generate (e.g., obtain) a verification hash value. The integrity verification device 300 generates (e.g., outputs) an interrupt signal INT based on the reference hash value RHASH included in the selected configuration record CRk and the verification hash value.

For example, when the verification hash value is the same as the reference hash value RHASH included in the selected configuration record CRk, the integrity verification device 300 may determine that the verification data VDk has integrity. In this case, the integrity verification device 300 may select a next configuration record among the plurality of configuration records CR1~CRn, and perform the above-described operations on the next configuration record.

When the verification hash value is different from the reference hash value RHASH included in the selected configuration record CRk, the integrity verification device 300 may determine that the verification data VDk does not have integrity, and provide the interrupt signal INT to the CPU 100. In one or more exemplary embodiments, when the CPU 100 receives the interrupt signal INT from the integrity verification device 300, the CPU 100 may determine that the verification data VDk stored in the memory device 200 is changed by an attack from outside, and perform a predetermined operation, such as at least one of deleting the verification data VDk from the memory device 200, generating an alarm signal, reporting the attack to a server, outputting the verification data VDk to a server, etc.

In one or more exemplary embodiments, the CPU 100 may perform one of a plurality of hash operations on each of the plurality of verification data VD1, VD2, . . . , VDn to generate the reference hash value RHASH. For example, the CPU 100 may perform a hash operation corresponding to one of Secure Hash Algorithm (SHA)-1, SHA-256, SHA-384, and SHA-512 on each of the plurality of verification data VD1, VD2, . . . , VDn to generate the reference hash value RHASH, although it is understood that one or more other exemplary embodiments are not limited to the above hash operations. When SHA-1 is used, the reference hash value RHASH may have a size of 160 bits. When SHA-256 is used, the reference hash value RHASH may have a size of 256 bits. When SHA-384 is used, the reference hash value RHASH may have a size of 384 bits. When SHA-512 is used, the reference hash value RHASH may have a size of 512 bits. In this case, each of the plurality of configuration records CR1~CRn, which are provided by the CPU 100 to the integrity verification device 300, may further include hash type information HTYPE indicating a type of the hash operation performed on each of the plurality of verification data VD1, VD2, . . . , VDn to generate the reference hash value RHASH. The integrity verification device 300 may perform a hash operation, which corresponds to the hash type information HTYPE included in the selected configuration record CRk, on the verification data VDk to generate the verification hash value.

Figure 2:
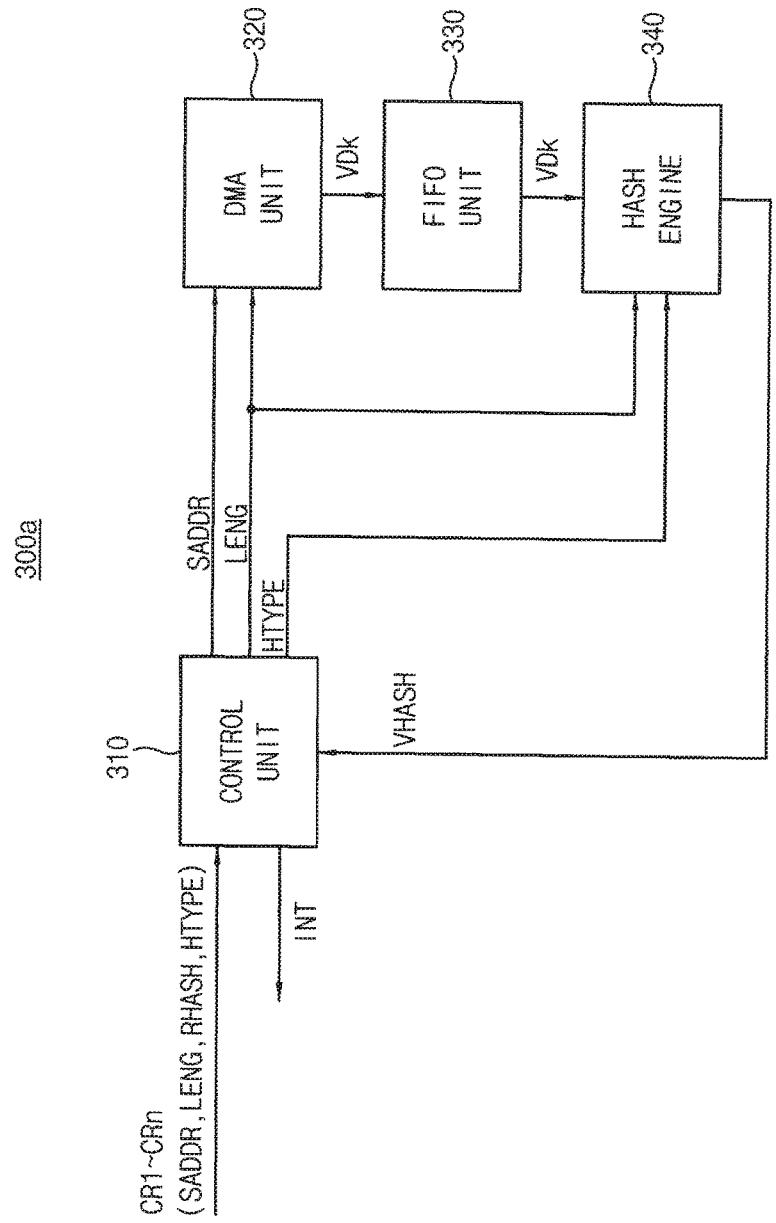
FIG. 2 is a block diagram illustrating an example of an integrity verification device included in an electronic system of FIG. 1, according to an exemplary embodiment.

FIG. 2 is a block diagram illustrating an example of an integrity verification device 300a included in an electronic system 10 of FIG. 1, according to an exemplary embodiment.

Referring to FIG. 2, an integrity verification device 300a may include a control unit 310 (e.g., controller), a direct memory access (DMA) unit 320 (e.g., direct memory accessor), a first-input first-output (FIFO) memory unit 330 (e.g., FIFO memory), and a hash engine 340.

The control unit 310 may internally store the plurality of configuration records CR1~CRn received from the CPU 100. The control unit 310 may circularly select each of the plurality of configuration records CR1~CRn, provide the start address SADDR and the data length LENG included in the selected configuration record CRk to the DMA unit 320, and provide the data length LENG and the hash type information HTYPE included in the selected configuration record CRk to the hash engine 340.

The DMA unit 320 may read the verification data VDk, which corresponds to the start address SADDR and the data length LENG received from the control unit 310, from the memory device 200, and store the verification data VDk in the FIFO memory unit 330. The DMA unit 320 may directly access the memory device 200 without intervention of the CPU 100 to read the verification data VDk from the memory device 200.

The hash engine 340 may include a hardware structure that is capable of performing various types of hash operations. The hash engine 340 may perform a hash operation, which corresponds to the hash type information HTYPE received from the control unit 310, on the verification data VDk, which is stored in the FIFO memory unit 330, based on the data length LENG received from the control unit 310 to generate the verification hash value VHASH.

In some example embodiments, a size of the FIFO memory unit 330 may be smaller than a size of the verification data VDk. The hash engine 340 may read the verification data VDk from the FIFO memory unit 330 and perform the hash operation on the verification data VDk at the same time as the DMA unit 320 stores the verification data VDk in the FIFO memory unit 330. Therefore, the FIFO memory unit 330 may store only a part of the verification data VDk at any time while the DMA unit 320 stores the verification data VDk in the FIFO memory unit 330 and the hash engine 340 reads the verification data VDk from the FIFO memory unit 330 and performs the hash operation on the verification data VDk.

The control unit 310 may determine whether the verification data VDk has integrity by comparing the verification hash value VHASH with the reference hash value RHASH included in the selected configuration record CRk.

For example, when the verification hash value VHASH is the same as the reference hash value RHASH included in the selected configuration record CRk, the control unit 310 may determine that the verification data VDk has integrity. In this case, the control unit 310 may select next configuration record CR(k+1) among the plurality of configuration records CR1~CRn, provide the start address SADDR and the data length LENG included in the selected configuration record CR(k+1) to the DMA unit 320, and provide the data length LENG and the hash type information HTYPE included in the selected configuration record CR(k+1) to the hash engine 340.

When the verification hash value VHASH is different from the reference hash value RHASH included in the selected configuration record CRk, the control unit 310 may determine that the verification data VDk does not have integrity, and provide the interrupt signal INT to the CPU 100.

Figure 3:
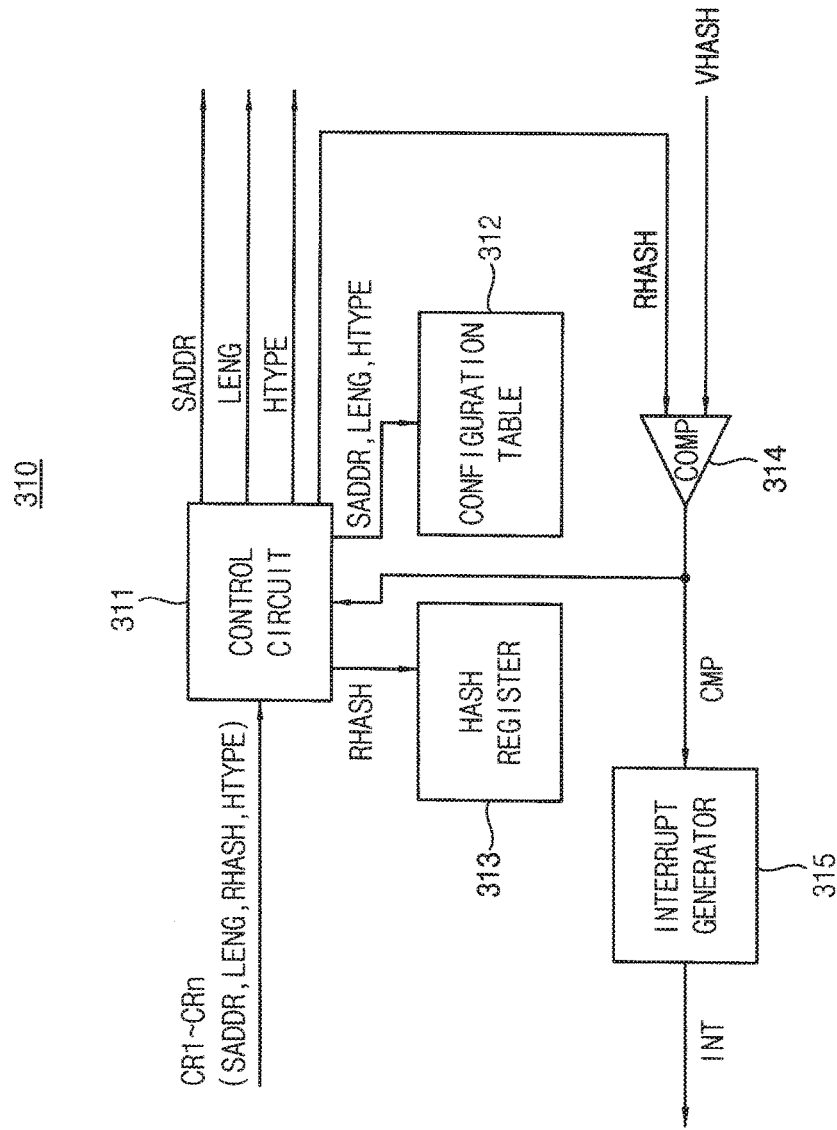
FIG. 3 is a block diagram illustrating an example of a control unit included in an integrity verification device of FIG. 2.

FIG. 3 is a block diagram illustrating an example of a control unit 310 included in an integrity verification device 300a of FIG. 2.

Referring to FIG. 3, the control unit 310 may include a control circuit 311, a configuration table 312, a hash register 313, a comparator COMP 314, and an interrupt generator 315.

The control circuit 311 may receive the plurality of configuration records CR1~CRn from the CPU 100. The control circuit 311 may store the start address SADDR, the data length LENG, and the hash type information HTYPE included in each of the plurality of configuration records CR1~CRn in the configuration table 312, and store the reference hash value RHASH included in each of the plurality of configuration records CR1~CRn in the hash register 313.

FIG. 4 is a diagram illustrating an example of a configuration table 312 included in a control unit 310 of FIG. 3.

Referring to FIG. 4, the configuration table 312 may include an enable field EN_F, a start address field SADDR_F, a data length field LENG_F, and a hash type information field HTYPE_F.

As illustrated in FIG. 4, the control circuit 311 may store the start address SADDR, the data length LENG, and the hash type information HTYPE included in each of the plurality of configuration records CR1~CRn in the start address field SADDR_F, the data length field LENG_F, and the hash type information field HTYPE_F, respectively. The control circuit 311 may store a first value H corresponding to a logic high level in the enable field EN_F at an initial stage.

The enable field EN_F may represent whether an integrity verification operation is to be performed on the verification data corresponding to each entry of the configuration table 312.

FIG. 5 is a diagram illustrating an example of a hash register 313 included in a control unit 310 of FIG. 3.

Referring to FIG. 5, the hash register 313 may include a reference hash value field RHASH_F.

As illustrated in FIG. 5, the control circuit 311 may store the reference hash value RHASH included in each of the plurality of configuration records CR1~CRn in the reference hash value field RHASH_F.

The start address SADDR, the data length LENG, and the hash type information HTYPE stored in the configuration table 312 may be related to the reference hash value RHASH stored in the hash register 313 using an identifier field (e.g., a serial number field NO) included in both the configuration table 312 and the hash register 313.

The reference hash values RHASH may have different sizes according to the hash operations, which are indicated by the hash type information HTYPE, used to generate the reference hash values RHASH.

For example, as illustrated in FIGS. 4 and 5, the reference hash values RHASH1 and RHASH2 included in the first configuration record CR1 and the second configuration record CR2, respectively, may have a size 160 bits each since the hash type information HTYPE1 and HTYPE2 included in the first configuration record CR1 and the second configuration record CR2, respectively, correspond to SHA-1. On the other hand, the reference hash value RHASHn included in the n-th configuration record CRn may have a size of 256 bits since the hash type information HTYPEn included in the n-th configuration record CRn corresponds to SHA-256.

Since the integrity verification device 300 is a hardware device, a size of a storage area included in the integrity verification device 300 may be fixed. That is, the hash register 313 may have a fixed size. Therefore, a number of the reference hash values RHASH that are able to be stored in the hash register 313 may be determined based on the hash type information HTYPE included in each of the plurality of configuration records CR1~CRn. For example, when a size of the hash register 313 is 800 bits, five reference hash values RHASH generated based on SHA-1 may be stored in the hash register 313, three reference hash values RHASH generated based on SHA-1 and one reference hash value RHASH generated based on SHA-256 may be stored in the hash register 313, one reference hash value RHASH generated based on SHA-1 and two reference hash values RHASH generated based on SHA-256 may be stored in the hash register 313, or three reference hash values RHASH generated based on SHA-256 may be stored in the hash register 313. Therefore, a number of the plurality of configuration records CR1~CRn that are able to be stored in the control unit 310 may be determined based on the size of the hash register 313 and the hash type information HTYPE included in each of the plurality of configuration records CR1~CRn.

Referring to FIGS. 3, 4 and 5, the control circuit 311 may circularly select each of the entries of the configuration table 312 storing the first value H in the enable field EN_F. The control circuit 311 may output the start address SADDR, the data length LENG, and the hash type information HTYPE included in the selected entry of the configuration table 312, and output the reference hash value RHASH from the hash register 313 that is related to the selected entry of the configuration table 312. As described above with reference to FIG. 2, the start address SADDR and the data length LENG output from the control circuit 311 may be provided to the DMA unit 320, and the data length LENG and the hash type information HTYPE output from the control circuit 311 may be provided to the hash engine 340. In addition, the reference hash value RHASH output from the control circuit 311 may be provided to the comparator 314.

The comparator 314 may receive the reference hash value RHASH from the control circuit 311, and receive the verification hash value VHASH from the hash engine 340. The comparator 314 may generate a comparison signal CMP by comparing the verification hash value VHASH with the reference hash value RHASH. For example, the comparator 314 may generate the comparison signal CMP having a first logic level when the verification hash value VHASH is the same as the reference hash value RHASH, and generate the comparison signal CMP having a second logic level when the verification hash value VHASH is different from the reference hash value RHASH. In one or more exemplary embodiments, the first logic level may be a logic low level, and the second logic level may be a logic high level. In one or more other exemplary embodiments, the first logic level may be the logic high level, and the second logic level may be the logic low level.

When the control circuit 311 receives the comparison signal CMP having the first logic level from the comparator 314, the control circuit 311 may select a next entry from among entries of the configuration table 312 storing the first value H in the enable field EN_F, output the start address SADDR, the data length LENG, and the hash type information HTYPE included in the selected entry of the configuration table 312, and output the reference hash value RHASH from the hash register 313 that is related to the selected entry of the configuration table 312.

Conversely, when the interrupt generator 315 receives the comparison signal CMP having the second logic level from the comparator 314, the interrupt generator 315 may provide the interrupt signal INT to the CPU 100.

In one or more exemplary embodiments, the CPU 100 may provide a disable signal corresponding to at least one of the plurality of configuration records CR1~CRn to the integrity verification device 300 during the operation of the integrity verification device 300. When the control circuit 311 receives the disable signal from the CPU 100, the control circuit 311 may store a second value corresponding to a logic low level in the enable field EN_F of an entry corresponding to the disable signal in the configuration table 312. As described above, since the control circuit 311 circularly selects each of the entries of the configuration table 312 storing the first value H in the enable field EN_F, the integrity verification device 300 may not perform the integrity verification operation on verification data corresponding to the disable signal.

Figure 6:
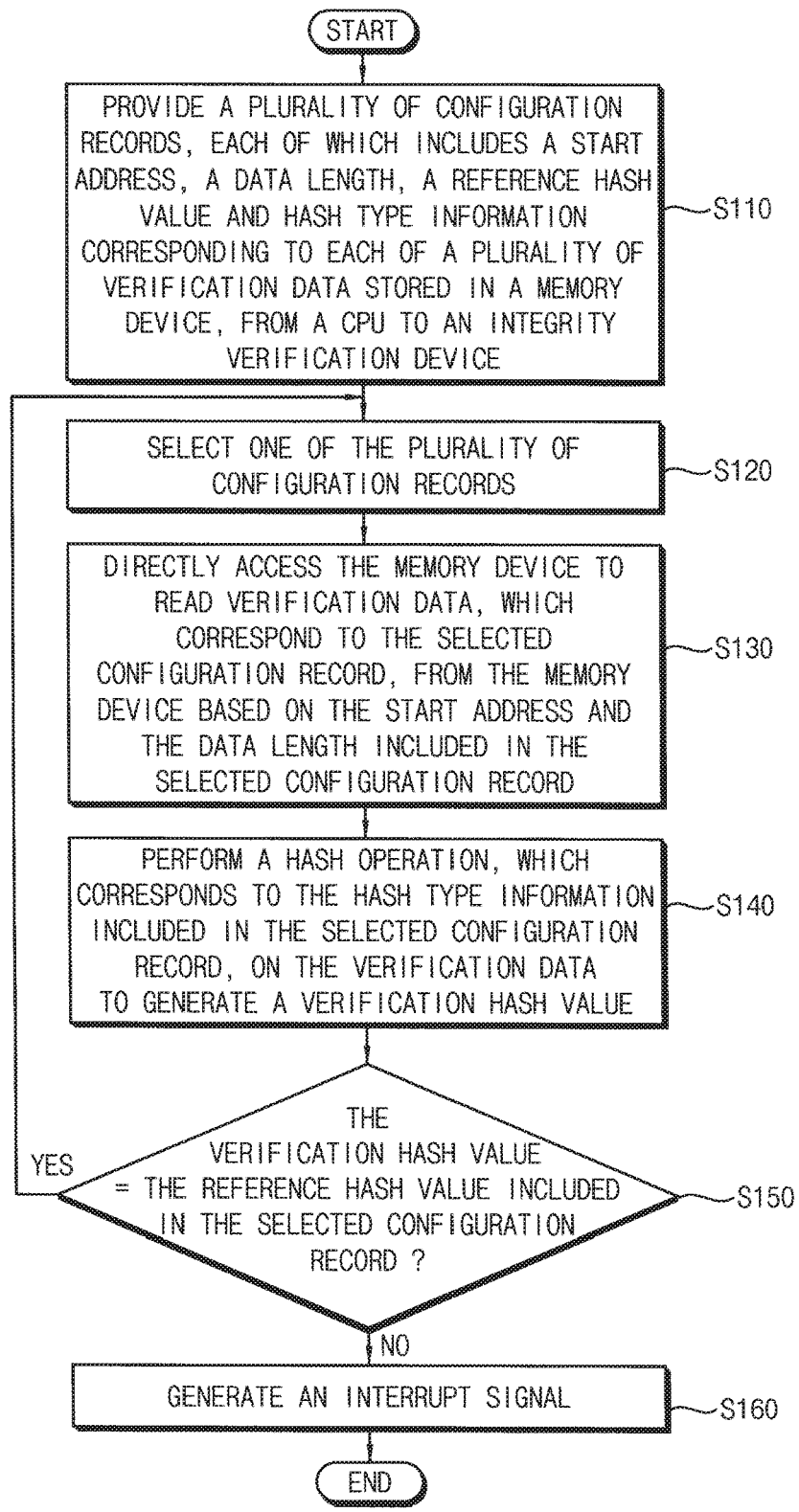
FIG. 6 is a flowchart for describing an operation of an electronic system of FIG. 1.

FIG. 6 is a flowchart for describing an operation of an electronic system 10 of FIG. 1.

Referring to FIGS. 1 to 6, the CPU 100 generates the plurality of configuration records CR1~CRn, each of which includes the start address SADDR, the data length LENG, the reference hash value RHASH, and the hash type information HTYPE corresponding to each of the plurality of verification data VD1, VD2, . . . , VDn stored in the memory device 200, and provides the plurality of configuration records CR1~CRn to the integrity verification device 300 (operation S110).

The integrity verification device 300 internally stores the plurality of configuration records CR1~CRn received from the CPU 100, and selects one of the plurality of configuration records CR1~CRn (operation S120). For example, the integrity verification device 300 may circularly select one of the plurality of configuration records CR1~CRn in an order from the first configuration record CR1 to the n-th configuration record CRn.

The integrity verification device 300 directly accesses the memory device 200 without intervention of the CPU 100 and reads verification data VDk, which corresponds to the selected configuration record CRk, from the memory device 200 based on the start address SADDR and the data length LENG included in the selected configuration record CRk (operation S130).

The integrity verification device 300 performs a hash operation, which corresponds to the hash type information HTYPE included in the selected configuration record CRk, on the verification data VDk, which is read from the memory device 200, to generate the verification hash value VHASH (operation S140).

The integrity verification device 300 compares the verification hash value VHASH with the reference hash value RHASH included in the selected configuration record CRk (operation S150).

When the verification hash value VHASH is the same as the reference hash value RHASH included in the selected configuration record CRk (operation S150: yes), the integrity verification device 300 performs operations S120, S130, S140 and S150 again on a next configuration record CR(k+1). In operation S120, the integrity verification device 300 selects the next configuration record CR(k+1) among the plurality of configuration records CR1~CRn to perform an integrity verification operation on next verification data VD(k+1).

When the verification hash value VHASH is different from the reference hash value RHASH included in the selected configuration record CRk (operation S150: no), the integrity verification device 300 provides the interrupt signal INT to the CPU 100 (operation S160).

If an electronic system detects whether sensitive data, such as personal information, a cryptographic key, etc., is changed using software, a CPU load may increase such that performance of the electronic system is degraded and power consumption of the electronic system increases. In addition, if an electronic system detects whether sensitive data, such as personal information, a cryptographic key, etc., is changed using software, a reference hash value, which is used to determine whether the sensitive data is changed, may also be exposed to an attack from outside.

As described above with reference to FIGS. 1 to 6, the CPU 100 included in the electronic system 10 provides the plurality of configuration records CR1~CRn, each of which includes the start address SADDR, the data length LENG, the reference hash value RHASH, and the hash type information HTYPE corresponding to each of the plurality of verification data VD1, VD2, . . . , VDn stored in the memory device 200, to the integrity verification device 300 that is implemented as a hardware device. The integrity verification device 300 stores the plurality of configuration records CR1~CRn received from the CPU 100 in an internal register, performs the integrity verification operation on each of the plurality of verification data VD1, VD2, . . . , VDn in the background while the electronic system 10 operates, and provides the interrupt signal INT to the CPU 100 when detecting a change of the plurality of verification data VD1, VD2, . . . , VDn. Therefore, the electronic system 10 effectively detects damage to data stored in the memory device 200.

Figure 7:
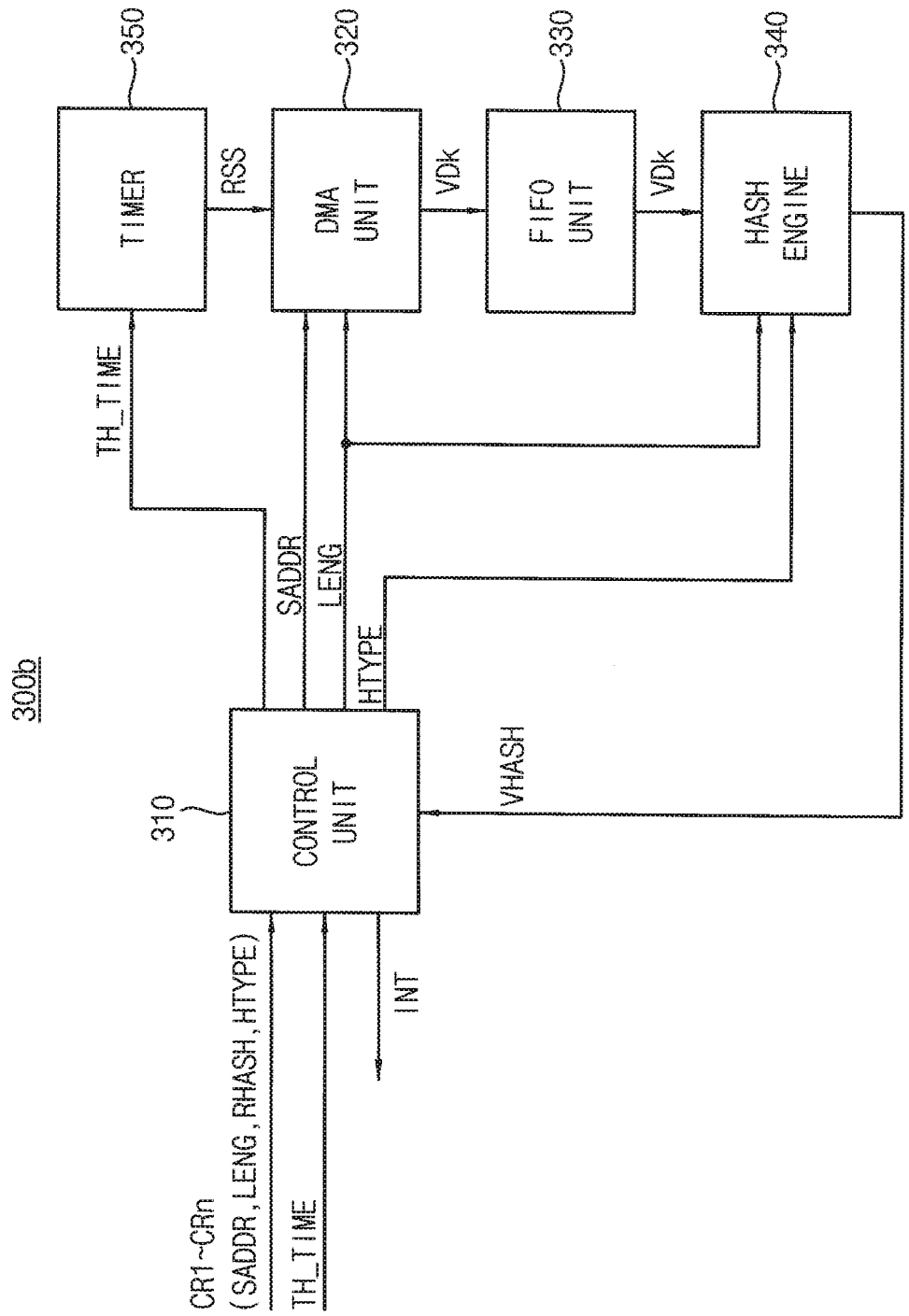
FIG. 7 is a block diagram illustrating an example of an integrity verification device included in an electronic system of FIG. 1, according to another exemplary embodiment.

FIG. 7 is a block diagram illustrating an example of an integrity verification device 300b included in an electronic system 10 of FIG. 1, according to another exemplary embodiment.

Referring to FIG. 7, an integrity verification device 300b may include a control unit 310, a DMA unit 320, a FIFO memory unit 330, a hash engine 340, and a timer 350.

The integrity verification device 300b of FIG. 7 may be the same as or similar to the integrity verification device 300a of FIG. 2 except that the integrity verification device 300b of FIG. 7 further includes the timer 350.

The timer 350 may generate a read start signal RSS at every threshold time interval TH_TIME.

When the DMA unit 320 receives the read start signal RSS from the timer 350, the DMA unit 320 may perform a burst read operation on the memory device 200 to read the verification data VDk from the memory device 200.

Figure 8:
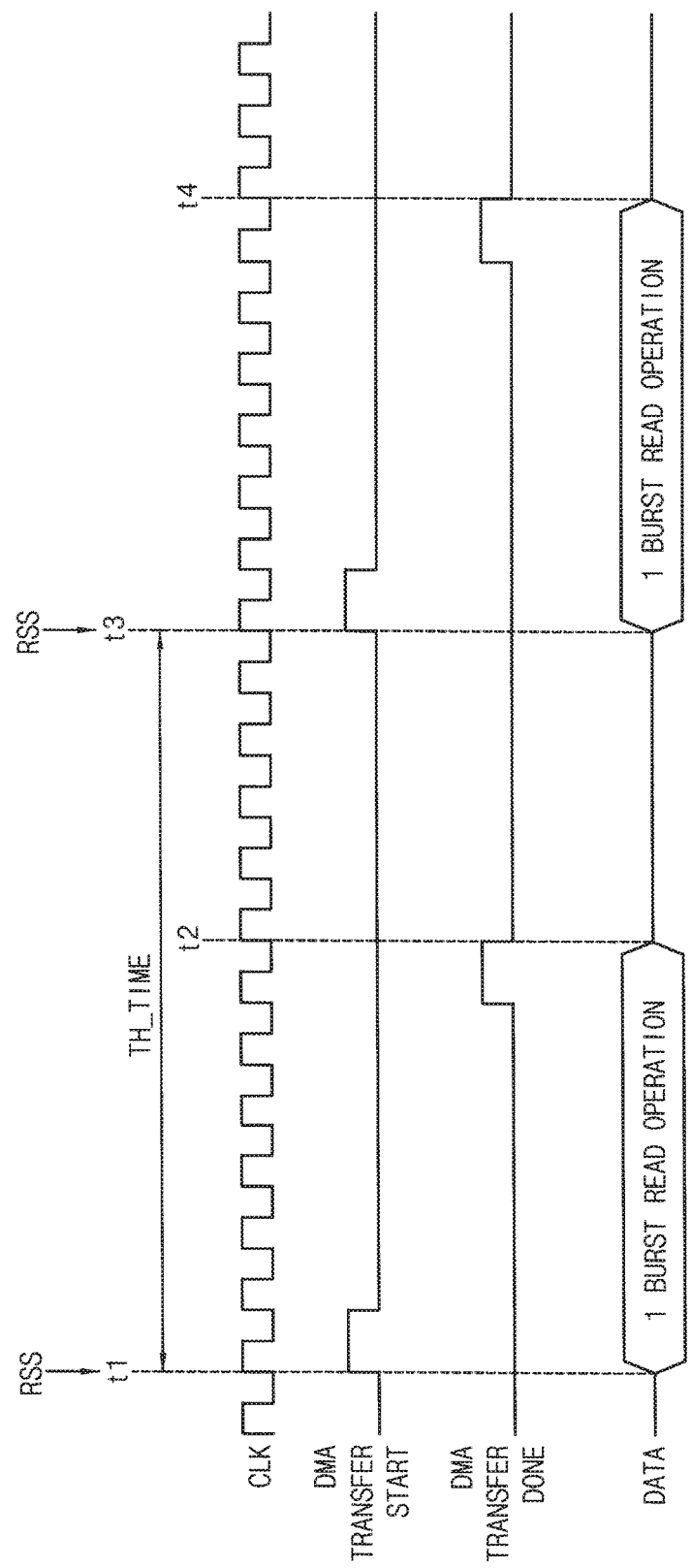
FIG. 8 is a diagram for describing an operation of a direct memory access (DMA) unit included in an integrity verification device of FIG. 7.

FIG. 8 is a diagram for describing an operation of a direct memory access (DMA) unit 320 included in an integrity verification device 300b of FIG. 7.

In FIG. 8, the DMA unit 320 may perform a read operation on the memory device 200 in synchronization with a clock signal CLK.

Referring to FIGS. 7 and 8, the DMA unit 320 may receive the read start signal RSS from the timer 350 at a first time t1. Accordingly, the DMA unit 320 may start the burst read operation on the memory device 200 with a DMA transfer start signal at the first time t1, and finish the burst read operation on the memory device 200 with a DMA transfer done signal at a second time t2. Subsequently, the DMA unit 320 may stay in an idle mode without performing a read operation on the memory device 200 until the DMA unit 320 receives the read start signal RSS again from the timer 350.

The DMA unit 320 may receive the read start signal RSS again from the timer 350 at a third time t3. Accordingly, the DMA unit 320 may start the burst read operation on the memory device 200 with the DMA transfer start signal at the third time t3, and finish the burst read operation on the memory device 200 with the DMA transfer done signal at a fourth time t4.

As described above, since the DMA unit 320 performs the burst read operation one time on the memory device 200 to read the verification data VDk when the DMA unit 320 receives the read start signal RSS from the timer 350, an access frequency of the DMA unit 320 to the memory device 200 may be adjusted based on a threshold time interval TH_TIME.

In one or more exemplary embodiments, the CPU 100 may provide a value of the threshold time interval TH_TIME to the control unit 310, the control unit 310 may provide the value of the threshold time interval TH_TIME to the timer 350, and the timer 350 may generate the read start signal RSS at every threshold time interval TH_TIME. Therefore, the CPU 100 may control the access frequency of the integrity verification device 300 to the memory device 200 to perform the integrity verification operation by adjusting the threshold time interval TH_TIME. As such, the CPU 100 may increase a security level of the electronic system 10 by decreasing the threshold time interval TH_TIME, and decrease power consumption of the electronic system 10 by increasing the threshold time interval TH_TIME.

Although an operation of the electronic system 10 to perform the integrity verification operation on the plurality of verification data VD1, VD2, . . . , VDn stored in the memory device 200 is described with reference to FIGS. 1 to 8, it is understood that one or more other exemplary embodiments are not limited thereto. For example, according to another exemplary embodiment, the memory device 200 may store one verification data. In this case, the electronic system 10 may repeatedly perform the integrity verification operation on the one verification data to generate the interrupt signal INT.

Figure 9:
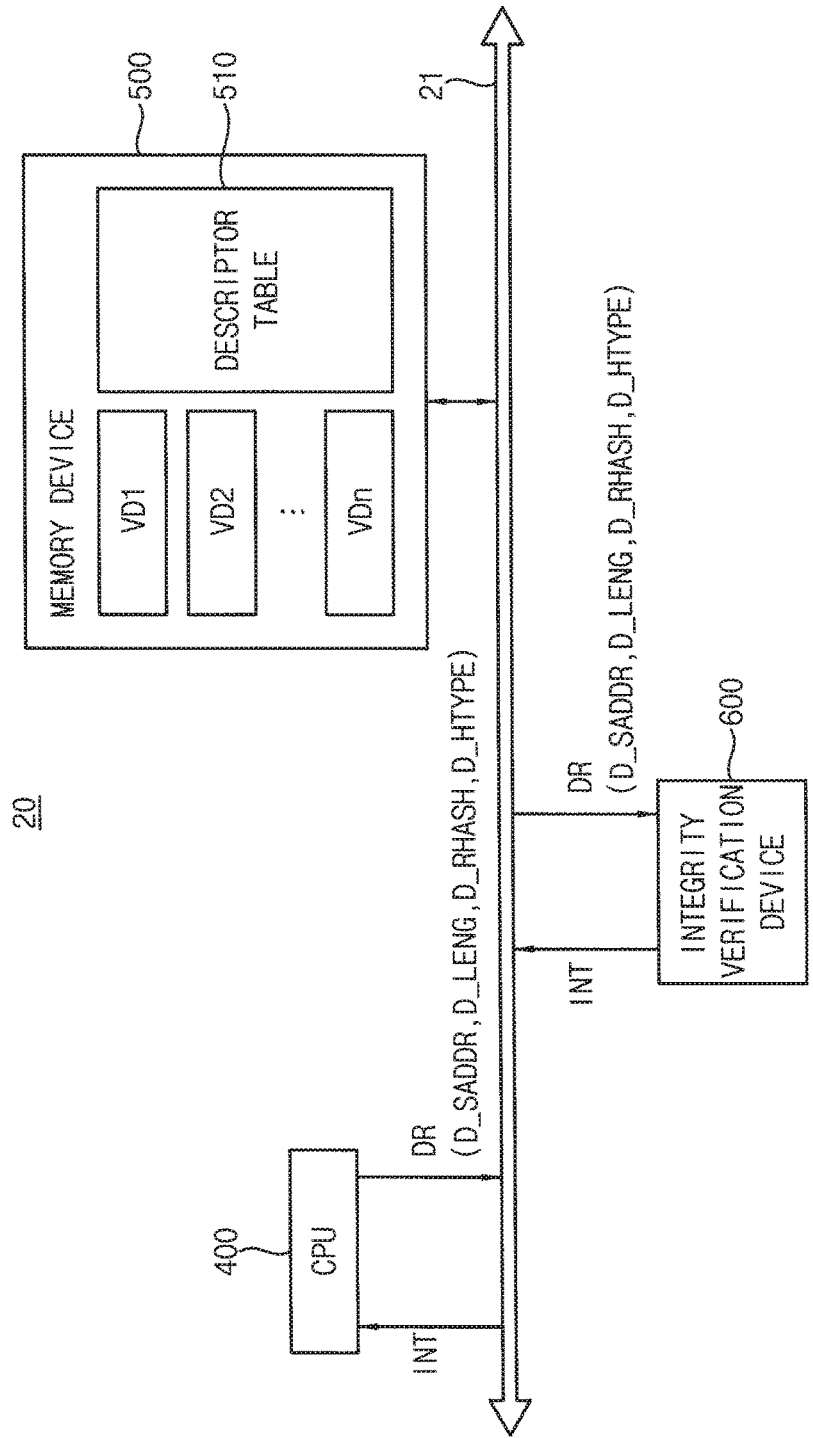
FIG. 9 is a block diagram illustrating an electronic system according to another exemplary embodiment.

FIG. 9 is a block diagram illustrating an electronic system 20 according to another exemplary embodiment.

Referring to FIG. 9, an electronic system 20 includes a processor (in the present exemplary embodiment, a CPU 400), a memory device 500 and an integrity verification device 600.

The CPU 400, the memory device 500 and the integrity verification device 600 communicate with each other via an internal bus 21.

The memory device 500 may include a memory controller to communicate data with the CPU 400 and the integrity verification device 600.

The memory device 500 stores a plurality of verification data VD1, VD2, . . . , VDn. Here, n represents a positive integer. In one or more exemplary embodiments, each of the plurality of verification data VD1, VD2, . . . , VDn may be sensitive data, such as personal information, a cryptographic key, etc. In one or more other exemplary embodiments, each of the plurality of verification data VD1, VD2, . . . , VDn may be executable codes of application software.

In one or more exemplary embodiments, the plurality of verification data VD1, VD2, . . . , VDn may be loaded on the memory device 500 by the CPU 400.

In one or more exemplary embodiments, the memory device 500 may be a dynamic random access memory (DRAM), such as a double data rate synchronous dynamic random access memory (DDR SDRAM), a low power double data rate synchronous dynamic random access memory (LPDDR SDRAM), a graphics double data rate synchronous dynamic random access memory (GDDR SDRAM), a Rambus dynamic random access memory (RDRAM), etc., or may be other volatile memory devices.

The CPU 400 performs a hash operation on each of the plurality of verification data VD1, VD2, . . . , VDn, which are stored in the memory device 500, to generate a reference hash value for each of the plurality of verification data VD1, VD2, . . . , VDn. The CPU 400 generates a start address for each of the plurality of verification data VD1, VD2, . . . , VDn that indicates a location of each of the plurality of verification data VD1, VD2, . . . , VDn on the memory device 500. The CPU 400 generates a data length for each of the plurality of verification data VD1, VD2, . . . , VDn that indicates a size of each of the plurality of verification data VD1, VD2, . . . , VDn. The CPU 400 generates a plurality of configuration records, each of which includes the start address, the data length and the reference hash value corresponding to each of the plurality of verification data VD1, VD2, . . . , VDn. The CPU 400 generates a descriptor table 510 including the plurality of configuration records, and stores the descriptor table 510 in the memory device 500.

In one or more exemplary embodiments, the CPU 400 may perform one of a plurality of hash operations on each of the plurality of verification data VD1, VD2, . . . , VDn to generate the reference hash value. For example, the CPU 400 may perform a hash operation corresponding to one of SHA-1, SHA-256, SHA-384 and SHA-512 on each of the plurality of verification data VD1, VD2, . . . , VDn to generate the reference hash value. When SHA-1 is used, the reference hash value may have a size of 160 bits. When SHA-256 is used, the reference hash value may have a size of 256 bits. When SHA-384 is used, the reference hash value may have a size of 384 bits. When SHA-512 is used, the reference hash value may have a size of 512 bits. In this case, each of the plurality of configuration records included in the descriptor table 510 may further include hash type information indicating a type of the hash operation performed on each of the plurality of verification data VD1, VD2, . . . , VDn to generate the reference hash value.

Figure 10:
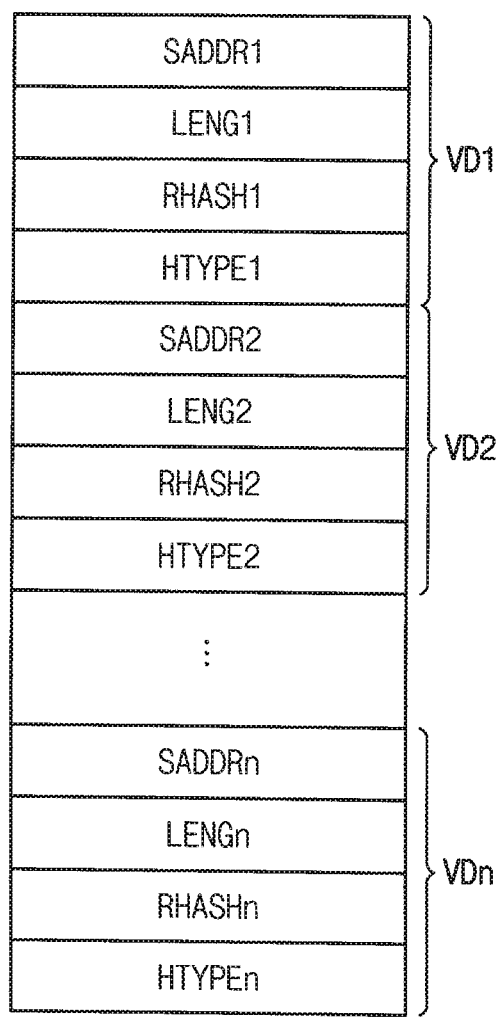
FIG. 10 is a diagram illustrating an example of a descriptor table stored in a memory device of FIG. 9, according to an exemplary embodiment.

FIG. 10 is a diagram illustrating an example of a descriptor table 510a stored in a memory device 500 of FIG. 9, according to an exemplary embodiment.

Referring to FIG. 10, a descriptor table 510a may successively store a first configuration record including a start address SADDR1, a data length LENG1, a reference hash value RHASH1, and hash type information HTYPE1 corresponding to the first verification data VD1, a second configuration record including a start address SADDR2, a data length LENG2, a reference hash value RHASH2, and hash type information HTYPE2 corresponding to the second verification data VD2, and an n-th configuration record including a start address SADDRn, a data length LENGn, a reference hash value RHASHn, and hash type information HTYPEn corresponding to the n-th verification data VDn.

Referring back to FIG. 9, the CPU 400 performs a hash operation on the descriptor table 510, which is stored in the memory device 500, to generate a descriptor reference hash value D_RHASH. The CPU 400 generates a descriptor start address D_SADDR indicating a location of the descriptor table 510 on the memory device 500. The CPU 400 generates a descriptor length D_LENG indicating a size of the descriptor table 510. The CPU 400 generates a descriptor record DR including the descriptor start address D_SADDR, the descriptor length D_LENG and the descriptor reference hash value D_RHASH, and provides the descriptor record DR to the integrity verification device 600.

The integrity verification device 600 internally stores the descriptor record DR received from the CPU 400. Subsequently, the integrity verification device 600 performs an integrity verification operation on the descriptor table 510.

In the integrity verification operation performed on the descriptor table 510, the integrity verification device 600 directly accesses the memory device 500 without intervention of the CPU 400 and reads the descriptor table 510 from the memory device 500 based on the descriptor start address D_SADDR and the descriptor length D_LENG included in the descriptor record DR.

The integrity verification device 600 performs a hash operation on the descriptor table 510, which is read from the memory device 500, using a hardware engine to generate a descriptor verification hash value.

In one or more exemplary embodiments, the CPU 400 may perform one of a plurality of hash operations on the descriptor table 510 to generate the descriptor reference hash value D_RHASH. For example, the CPU 400 may perform a hash operation corresponding to one of SHA-1, SHA-256, SHA-384 and SHA-512 on the descriptor table 510 to generate the descriptor reference hash value D_RHASH. In this case, the descriptor record DR, which is provided from the CPU 400 to the integrity verification device 600, may further include descriptor hash type information D_HTYPE indicating a type of the hash operation performed on the descriptor table 510 to generate the descriptor reference hash value D_RHASH. The integrity verification device 600 may perform a hash operation, which corresponds to the descriptor hash type information D_HTYPE included in the descriptor record DR, on the descriptor table 510 to generate the descriptor verification hash value.

The integrity verification device 600 determines whether the descriptor table 510 has integrity by comparing the descriptor verification hash value with the descriptor reference hash value D_RHASH included in the descriptor record DR to perform the integrity verification operation on the descriptor table 510.

When the descriptor verification hash value is different from the descriptor reference hash value D_RHASH included in the descriptor record DR, the integrity verification device 600 determines that the descriptor table 510 does not have integrity, and provides the interrupt signal INT to the CPU 400. In one or more exemplary embodiments, when the CPU 400 receives the interrupt signal INT from the integrity verification device 600, the CPU 400 may determine that the descriptor table 510 stored in the memory device 500 is changed by an attack from outside, and perform a predetermined operation, such as at least one of deleting the descriptor table 510 from the memory device 500, generating an alarm signal, reporting the attack to a server, outputting the descriptor table 510 to a server, etc.

When the descriptor verification hash value is the same as the descriptor reference hash value D_RHASH included in the descriptor record DR, the integrity verification device 600 determines that the descriptor table 510 has integrity. In this case, the integrity verification device 600 performs an integrity verification operation on each of the plurality of verification data VD1, VD2, . . . , VDn, which are stored in the memory device 500, based on the plurality of configuration records included in the descriptor table 510 to generate the interrupt signal INT. The interrupt signal INT generated by the integrity verification device 600 may be provided to the CPU 400.

In the integrity verification operation performed on each of the plurality of verification data VD1, VD2, . . . , VDn, the integrity verification device 600 selects one of the plurality of configuration records included in the descriptor table 510. Subsequently, the integrity verification device 600 directly accesses the memory device 500 without intervention of the CPU 400 and reads verification data, which corresponds to the selected configuration record, from the memory device 500 based on the start address and the data length included in the selected configuration record. The integrity verification device 600 performs a hash operation, which corresponds to the hash type information included in the selected configuration record, on the verification data, which is read from the memory device 500, to generate a verification hash value. The integrity verification device 600 determines whether the verification data has integrity by comparing the verification hash value with the reference hash value included in the selected configuration record to perform the integrity verification operation on the verification data.

For example, when the verification hash value is the same as the reference hash value included in the selected configuration record, the integrity verification device 600 may determine that the verification data has integrity. In this case, the integrity verification device 600 may select a next configuration record among the plurality of configuration records included in the descriptor table 510, and perform the integrity verification operation on the verification data corresponding to the next configuration record.

When the verification hash value is different from the reference hash value included in the selected configuration record, the integrity verification device 600 may determine that the verification data does not have integrity, and provide the interrupt signal INT to the CPU 400. In one or more exemplary embodiments, when the CPU 400 receives the interrupt signal INT from the integrity verification device 600, the CPU 400 may determine that the verification data stored in the memory device 500 is changed by an attack from outside, and perform a predetermined operation, such as at least one of deleting the verification data from the memory device 500, generating an alarm signal, reporting the attack to a server, outputting the verification data to a server, etc.

Figure 11:
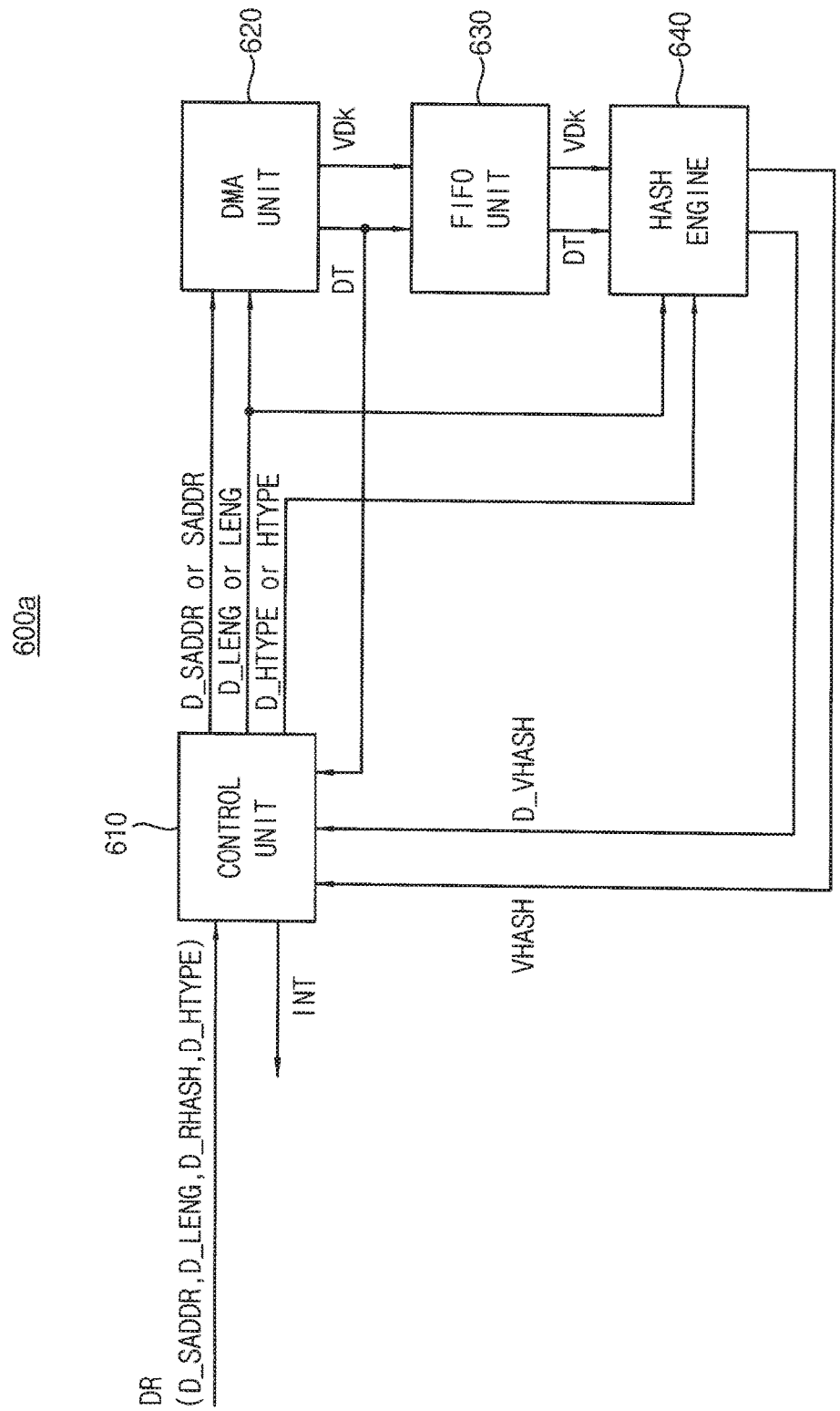
FIG. 11 is a block diagram illustrating an example of an integrity verification device included in an electronic system of FIG. 9, according to an exemplary embodiment.

FIG. 11 is a block diagram illustrating an example of an integrity verification device 600a included in an electronic system 20 of FIG. 9.

Referring to FIG. 11, an integrity verification device 600a may include a control unit 610, a DMA unit 620, a FIFO memory unit 630, and a hash engine 640.

The control unit 610 may store the descriptor record DR received from the CPU 400 in an internal register. The control unit 610 may provide the descriptor start address D_SADDR and the descriptor length D_LENG included in the descriptor record DR to the DMA unit 620, and provide the descriptor length D_LENG and the descriptor hash type information D_HTYPE included in the descriptor record DR to the hash engine 640.

The DMA unit 620 may read the descriptor table DT 510 from the memory device 500 based on the descriptor start address D_SADDR and the descriptor length D_LENG received from the control unit 610, and provide the descriptor table 510 to both the FIFO memory unit 630 and the control unit 610. The DMA unit 620 may directly access the memory device 500 without intervention of the CPU 400 to read the descriptor table 510 from the memory device 500.

When the control unit 610 receives the descriptor table 510 from the DMA unit 620, the control unit 610 may select one of the plurality of configuration records included in the descriptor table 510, and store the selected configuration record in an internal register. In one or more exemplary embodiments, the control unit 610 may circularly select each of the plurality of configuration records included in the descriptor table 510 each time the control unit 610 receives the descriptor table 510 from the DMA unit 620, and store the selected configuration record in the internal register.

The hash engine 640 may include a hardware structure that is capable of performing various types of hash operations. The hash engine 640 may perform a hash operation, which corresponds to the descriptor hash type information D_HTYPE received from the control unit 610, on the descriptor table 510, which is stored in the FIFO memory unit 630, based on the descriptor length D_LENG received from the control unit 610 to generate the descriptor verification hash value D_VHASH.

The control unit 610 may determine whether the descriptor table 510 has integrity by comparing the descriptor verification hash value D_VHASH received from the hash engine 640 with the descriptor reference hash value D_RHASH included in the descriptor record DR.

When the descriptor verification hash value D_VHASH is different from the descriptor reference hash value D_RHASH, the control unit 610 may determine that the descriptor table 510 does not have integrity, and provide the interrupt signal INT to the CPU 400.

When the descriptor verification hash value D_VHASH is the same as the descriptor reference hash value D_RHASH, the control unit 610 may determine that the descriptor table 510 has integrity, and perform the integrity verification operation on verification data corresponding to the selected configuration record stored in the internal register. Subsequently, the control unit 610 may perform the integrity verification operation on the descriptor table 510 again. When the descriptor verification hash value D_VHASH is the same as the descriptor reference hash value D_RHASH, the control unit 610 may select another configuration record among the plurality of configuration records included in the descriptor table 510 and perform the integrity verification operation on verification data corresponding to the selected configuration record.

Figure 12:
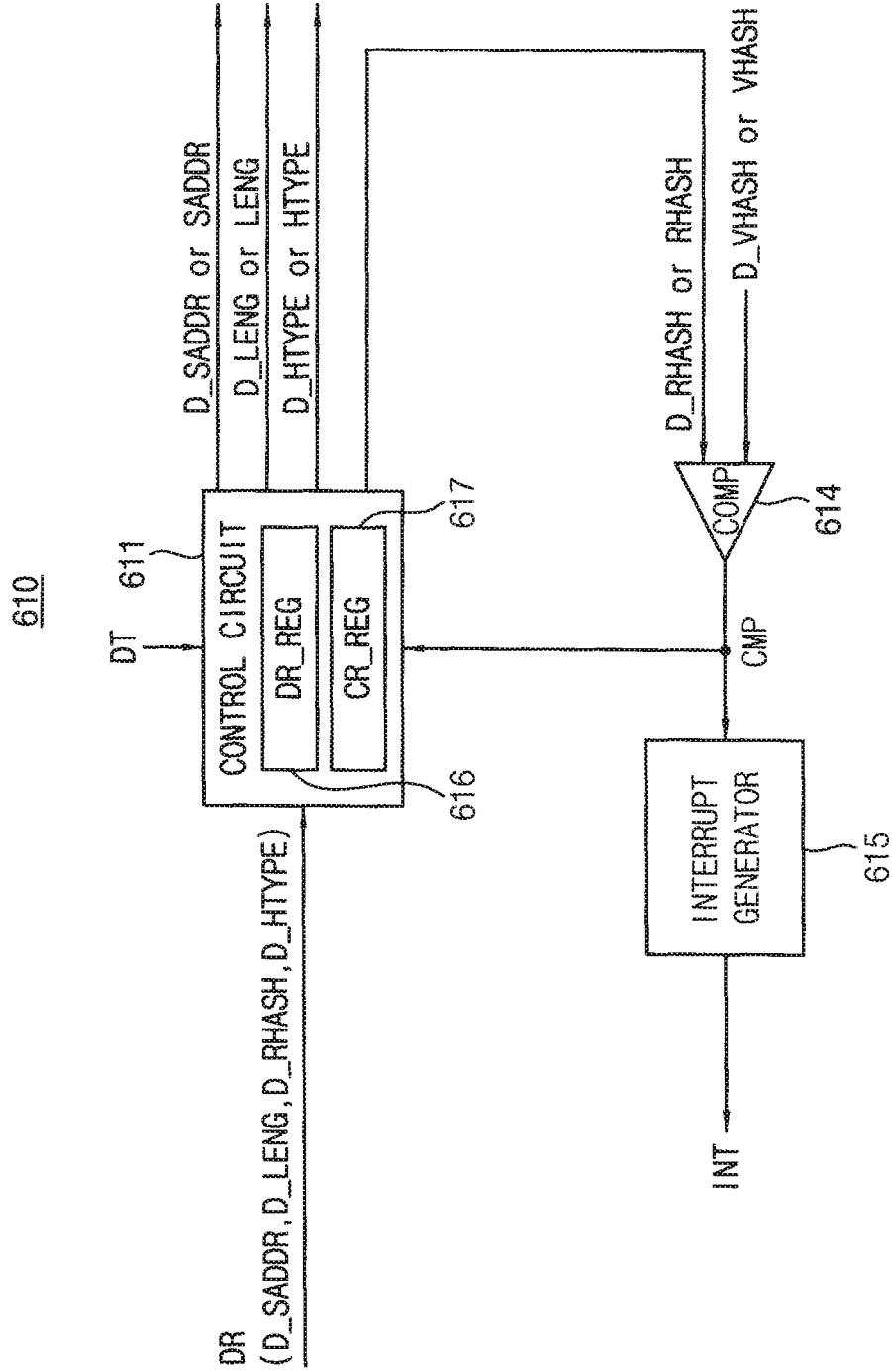
FIG. 12 is a block diagram illustrating an example of a control unit included in an integrity verification device of FIG. 11.

FIG. 12 is a block diagram illustrating an example of a control unit 610 included in an integrity verification device 600a of FIG. 11.

Referring to FIG. 12, the control unit 610 may include a control circuit 611, a comparator COMP 614, and an interrupt generator 615.

The control circuit 611 may include a descriptor record register DR_REG 616 and a configuration record register CR_REG 617.

Hereinafter, an operation of the integrity verification device 600a according to an exemplary embodiment will be described with reference to FIGS. 11 and 12.

The control circuit 611 may receive the descriptor record DR from the CPU 400, and store the descriptor record DR in the descriptor record register 616. The control circuit 611 may output the descriptor start address D_SADDR, the descriptor length D_LENG, the descriptor reference hash value D_RHASH, and the descriptor hash type information D_HTYPE included in the descriptor record DR. For example, the control circuit 611 may provide the descriptor start address D_SADDR and the descriptor length D_LENG to the DMA unit 620, provide the descriptor length D_LENG and the descriptor hash type information D_HTYPE to the hash engine 640, and provide the descriptor reference hash value D_RHASH to the comparator 614.

The DMA unit 620 may read the descriptor table 510 from the memory device 500 based on the descriptor start address D_SADDR and the descriptor length D_LENG, and provide the descriptor table 510 to both the FIFO memory unit 630 and the control unit 610.

Since the integrity verification device 600a is a hardware device, a size of the configuration record register 617 included in the control circuit 611 may be fixed. Therefore, when the control circuit 611 receives the descriptor table 510 from the DMA unit 620, the control circuit 611 may select one of the plurality of configuration records included in the descriptor table 510, and store the selected configuration record in the configuration record register 617. For example, the control circuit 611 may circularly select each of the plurality of configuration records included in the descriptor table 510 each time the control circuit 611 receives the descriptor table 510 from the DMA unit 620, and store the selected configuration record in the configuration record register 617.

The hash engine 640 may perform a hash operation, which corresponds to the descriptor hash type information D_HTYPE received from the control circuit 611, on the descriptor table 510, which is stored in the FIFO memory unit 630, based on the descriptor length D_LENG received from the control circuit 611 to generate the descriptor verification hash value D_VHASH.

The comparator 614 may receive the descriptor reference hash value D_RHASH from the control circuit 611, and receive the descriptor verification hash value D_VHASH from the hash engine 640. The comparator 614 may generate a comparison signal CMP by comparing the descriptor verification hash value D_VHASH with the descriptor reference hash value D_RHASH. For example, the comparator 614 may generate the comparison signal CMP having a first logic level when the descriptor verification hash value D_VHASH is the same as the descriptor reference hash value D_RHASH, and generate the comparison signal CMP having a second logic level when the descriptor verification hash value D_VHASH is different from the descriptor reference hash value D_RHASH. In one or more exemplary embodiments, the first logic level may be a logic low level, and the second logic level may be a logic high level. In one or more other exemplary embodiments, the first logic level may be the logic high level, and the second logic level may be the logic low level.

The interrupt generator 615 may provide the interrupt signal INT to the CPU 400 when the interrupt generator 615 receives the comparison signal CMP having the second logic level from the comparator 614.

When the control circuit 611 receives the comparison signal CMP having the first logic level from the comparator 614, the control circuit 611 may determine that the descriptor table 510 has integrity. In this case, the control circuit 611 may output the start address SADDR, the data length LENG, the reference hash value RHASH, and the hash type information HTYPE included in the selected configuration record stored in the configuration record register 617. For example, the control circuit 611 may provide the start address SADDR and the data length LENG to the DMA unit 620, provide the data length LENG and the hash type information HTYPE to the hash engine 640, and provide the reference hash value RHASH to the comparator 614.

The DMA unit 620 may directly access the memory device 500 without intervention of the CPU 400 and read the verification data VDk, which corresponds to the selected configuration record, from the memory device 500 based on the start address SADDR and the data length LENG received from the control circuit 611. The DMA unit 620 may store the verification data VDk in the FIFO memory unit 630.

The hash engine 640 may perform a hash operation, which corresponds to the hash type information HTYPE received from the control circuit 611, on the verification data VDk, which is stored in the FIFO memory unit 630, based on the data length LENG received from the control circuit 611 to generate the verification hash value VHASH.

In some example embodiments, a size of the FIFO memory unit 630 may be smaller than a size of the verification data VDk. The hash engine 640 may read the verification data VDk from the FIFO memory unit 630 and perform the hash operation on the verification data VDk at the same time as the DMA unit 620 stores the verification data VDk in the FIFO memory unit 630. Therefore, the FIFO memory unit 630 may store only a part of the verification data VDk at any time while the DMA unit 620 stores the verification data VDk in the FIFO memory unit 630 and the hash engine 640 reads the verification data VDk from the FIFO memory unit 630 and performs the hash operation on the verification data VDk.

The comparator 614 may receive the reference hash value RHASH included in the selected configuration record from the control circuit 611, and receive the verification hash value VHASH from the hash engine 640. The comparator 614 may generate the comparison signal CMP by comparing the verification hash value VHASH with the reference hash value RHASH. For example, the comparator 614 may generate the comparison signal CMP having the first logic level when the verification hash value VHASH is the same as the reference hash value RHASH, and generate the comparison signal CMP having the second logic level when the verification hash value VHASH is different from the reference hash value RHASH.

The interrupt generator 615 may provide the interrupt signal INT to the CPU 400 when the interrupt generator 615 receives the comparison signal CMP having the second logic level from the comparator 614.

When the control circuit 611 receives the comparison signal CMP having the first logic level from the comparator 614, the control circuit 611 may determine that the verification data VDk has integrity. In this case, the control circuit 611 may again output the descriptor start address D_SADDR, the descriptor length D_LENG, the descriptor reference hash value D_RHASH, and the descriptor hash type information D_HTYPE included in the descriptor record DR.

As described above with reference to FIGS. 11 and 12, the integrity verification device 600a may perform the integrity verification operation on the descriptor table 510 and perform the integrity verification operation on one of the plurality of verification data VD1, VD2, . . . , VDn alternately.

Figure 13:
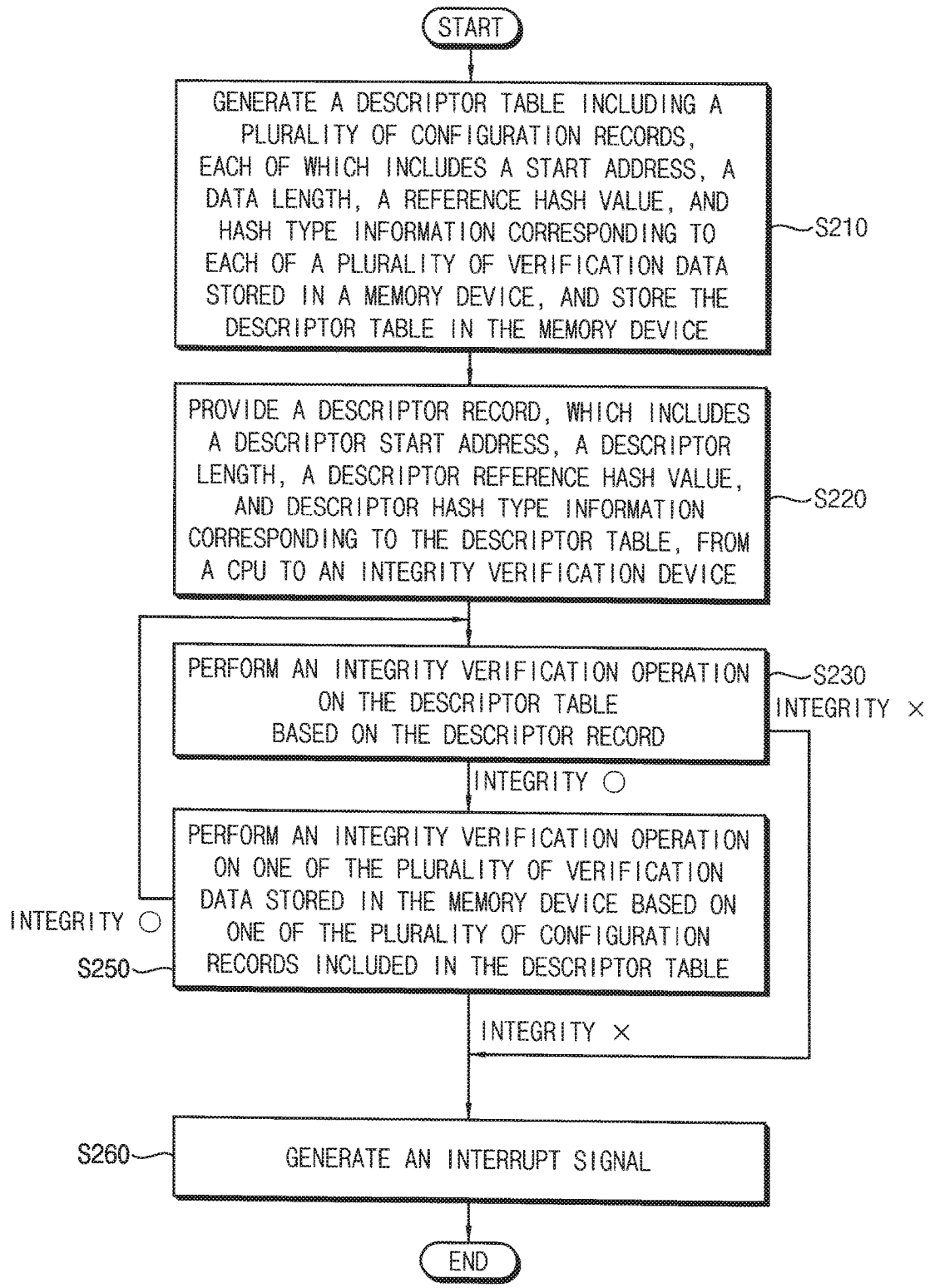
FIGS. 13, 14, and 15 are flowcharts for describing an operation of an electronic system of FIG. 9.
Figure 14:
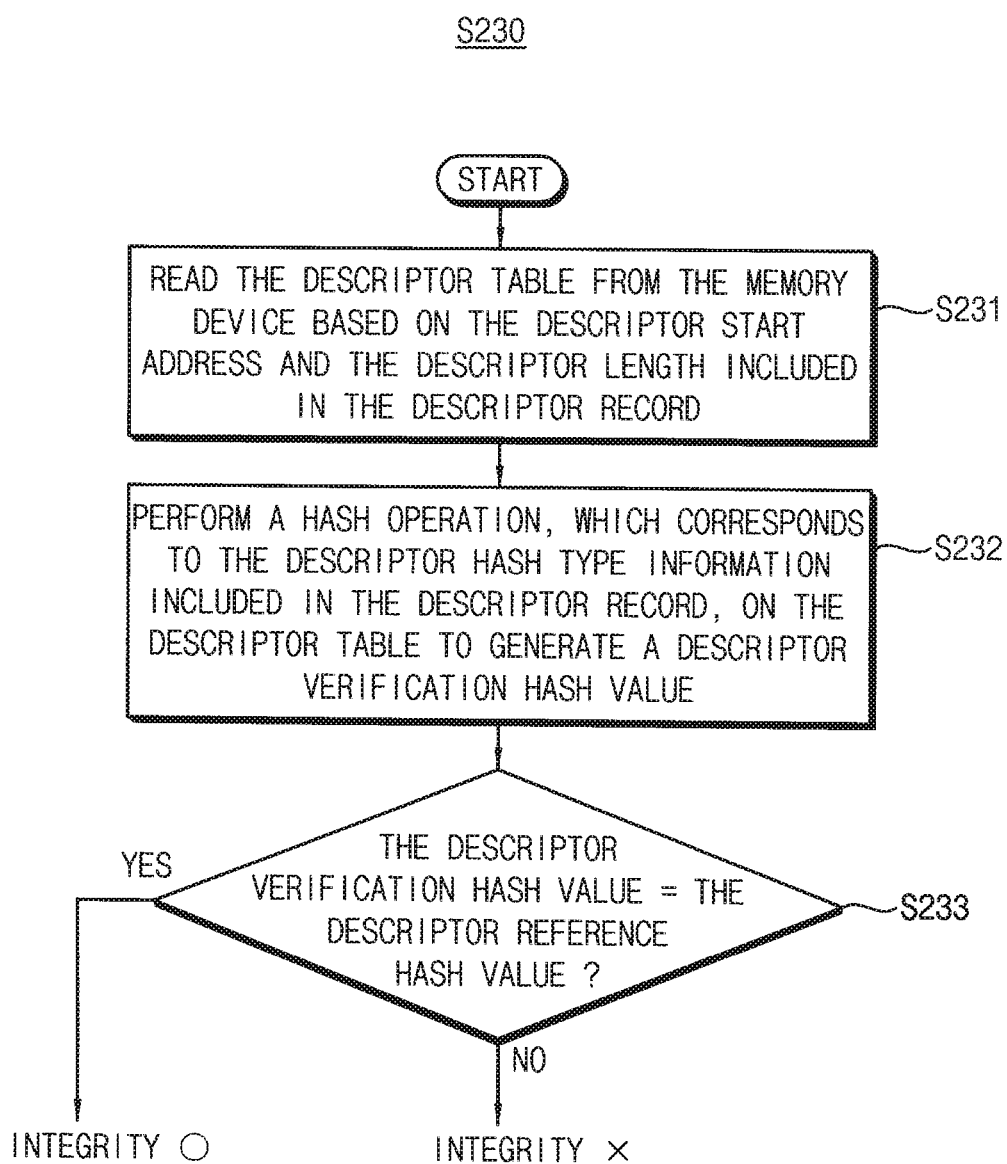
Figure 15:
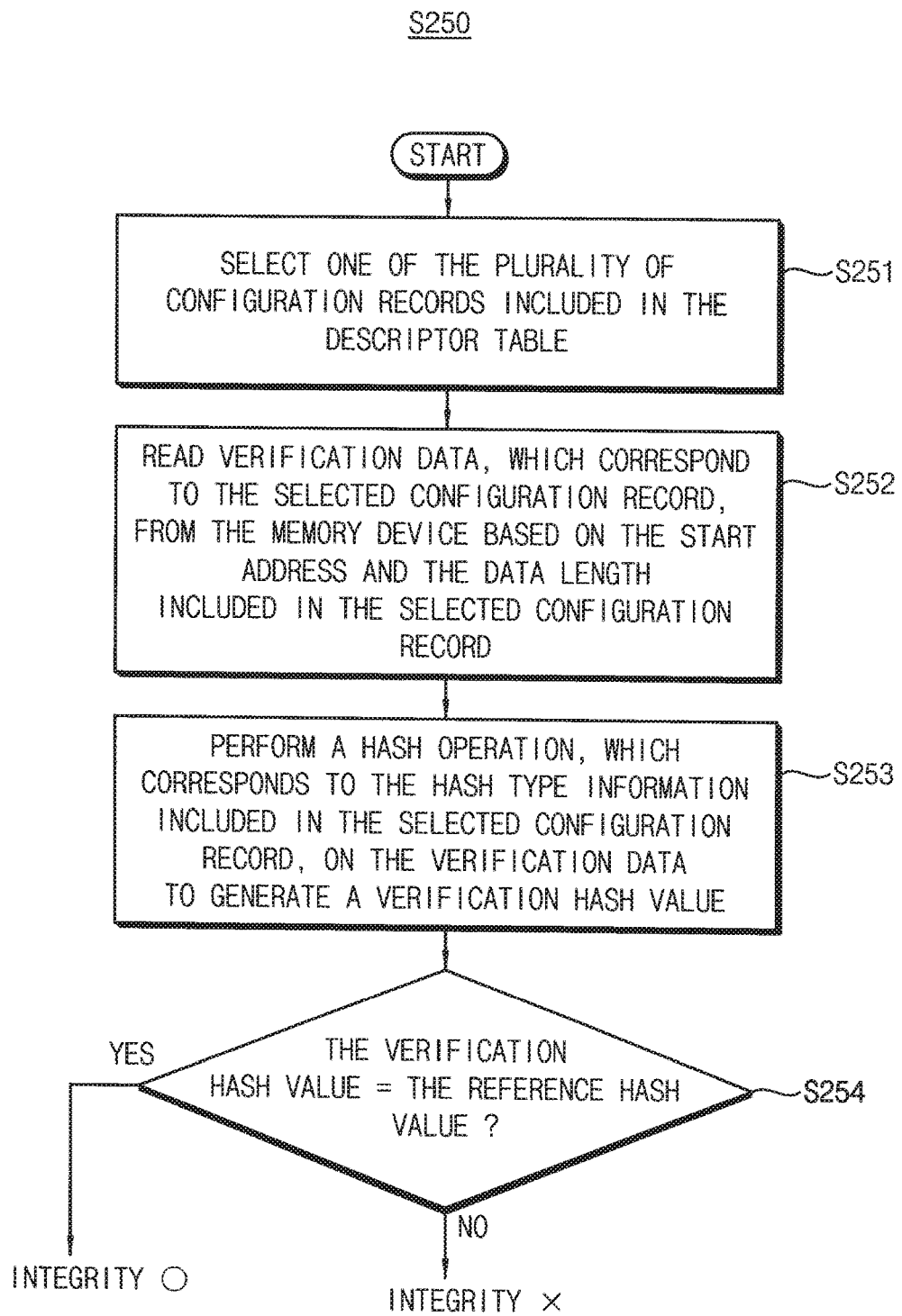

FIGS. 13, 14 and 15 are flowcharts for describing an operation of an electronic system 20 of FIG. 9.

Referring to FIGS. 9 to 15, the CPU 400 generates the descriptor table 510 including the plurality of configuration records, each of which includes the start address SADDR, the data length LENG, the reference hash value RHASH, and the hash type information HTYPE corresponding to each of the plurality of verification data VD1, VD2, . . . , VDn stored in the memory device 500, and stores the descriptor table 510 in the memory device 500 (operation S210).

The CPU 400 performs a hash operation on the descriptor table 510, which is stored in the memory device 500, to generate the descriptor reference hash value D_RHASH, generates the descriptor start address D_SADDR indicating a location of the descriptor table 510 on the memory device 500, and generates the descriptor length D_LENG indicating a size of the descriptor table 510. The CPU 400 generates the descriptor record DR including the descriptor start address D_SADDR, the descriptor length D_LENG, the descriptor reference hash value D_RHASH, and the descriptor hash type information D_HTYPE indicating a type of the hash operation performed on the descriptor table 510 to generate the descriptor reference hash value D_RHASH, and provides the descriptor record DR to the integrity verification device 600 (operation S220).

The integrity verification device 600 performs the integrity verification operation on the descriptor table 510 stored in the memory device 500 based on the descriptor record DR received from the CPU 400 (operation S230).

FIG. 14 is a flowchart illustrating an example of operation 230 of FIG. 13.

Referring to FIG. 14, the integrity verification device 600 may directly access the memory device 500 without intervention of the CPU 400 and read the descriptor table 510 from the memory device 500 based on the descriptor start address D_SADDR and the descriptor length D_LENG included in the descriptor record DR (operation S231).

The integrity verification device 600 may perform a hash operation, which corresponds to the descriptor hash type information D_HTYPE included in the descriptor record DR, on the descriptor table 510 using a hardware engine to generate the descriptor verification hash value D_VHASH (operation S232).

The integrity verification device 600 may determine that the descriptor table 510 does not have integrity when the descriptor verification hash value D_VHASH is different from the descriptor reference hash value D_RHASH included in the descriptor record DR, and determine that the descriptor table 510 has integrity when the descriptor verification hash value D_VHASH is the same as the descriptor reference hash value D_RHASH included in the descriptor record DR (operation S233).

Referring again to FIG. 13, when the integrity verification device 600 determines that the descriptor table 510 does not have integrity, the integrity verification device 600 may provide the interrupt signal INT to the CPU 400 (operation S260). In one or more exemplary embodiments, when the CPU 400 receives the interrupt signal INT from the integrity verification device 600, the CPU 400 may determine that the descriptor table 510 stored in the memory device 500 is changed by an attack from outside, and follow a predetermined operation, such as at least one of deleting the descriptor table 510 from the memory device 500, generating an alarm signal, reporting the attack to a server, outputting the descriptor table 510 to a server, etc.

When the integrity verification device 600 determines that the descriptor table 510 has integrity, the integrity verification device 600 may perform the integrity verification operation on one of the plurality of verification data VD1, VD2, ..., VDn stored in the memory device 500 based on one of the plurality of configuration records included in the descriptor table 510 (operation S250).

FIG. 15 is a flowchart illustrating an example of operation 250 of FIG. 13.

Referring to FIG. 15, the integrity verification device 600 may select one of the plurality of configuration records included in the descriptor table 510 (operation S251). The integrity verification device 600 may directly access the memory device 500 without intervention of the CPU 400 and read the verification data VDk, which correspond to the selected configuration record, from the memory device 500 based on the start address SADDR and the data length LENG included in the selected configuration record (operation S252).

The integrity verification device 600 may perform a hash operation, which corresponds to the hash type information HTYPE included in the selected configuration record, on the verification data VDk using a hardware engine to generate the verification hash value VHASH (operation S253).

The integrity verification device 600 may determine that the verification data VDk does not have integrity when the verification hash value VHASH is different from the reference hash value RHASH included in the selected configuration record, and determine that the verification data VDk has integrity when the verification hash value VHASH is the same as the reference hash value RHASH included in the selected configuration record (operation S254).

Referring again to FIG. 13, when the integrity verification device 600 determines that the verification data VDk does not have integrity, the integrity verification device 600 may provide the interrupt signal INT to the CPU 400 (operation S260). In some example embodiments, when the CPU 400 receives the interrupt signal INT from the integrity verification device 600, the CPU 400 may determine that the verification data VDk stored in the memory device 500 is changed by an attack from outside, and follow a predetermined step, such as deleting the verification data VDk from the memory device 500, generating an alarm signal, etc.

When the integrity verification device 600 determines that the verification data VDk has integrity, the integrity verification device 600 may perform the operations S230 and S240 again.

Figure 16:
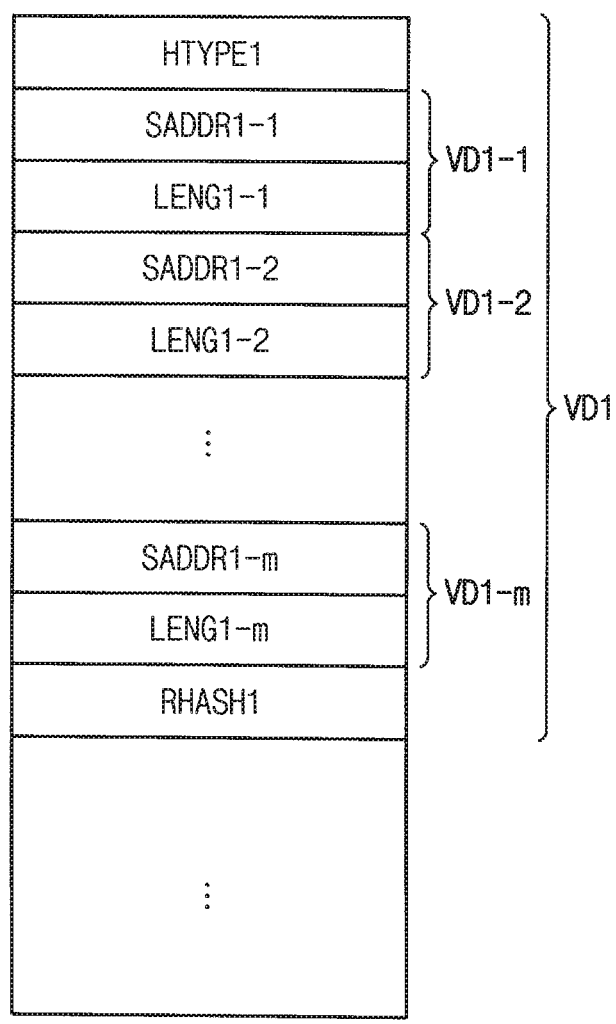
FIG. 16 is a diagram illustrating an example of a descriptor table stored in a memory device of FIG. 9, according to another exemplary embodiment.

FIG. 16 is a diagram illustrating an example of a descriptor table stored in a memory device of FIG. 9, according to another exemplary embodiment.

In one or more exemplary embodiments, at least one of the plurality of verification data VD1, VD2, ..., VDn may include first through m-th block verification data distributed in the memory device 500. For example, the first verification data VD1 may include first through m-th block verification data VD1-1, VD1-2, ..., VD1-$m$ distributed in the memory device 500. Here, m represents an integer equal to or greater than two. In this case, the start address SADDR included in a configuration record corresponding to the first verification data VD1 may include first through m-th start addresses SADDR1-1, SADDR1-2, ..., SADDR1-$m$ corresponding to the first through m-th block verification data VD1-1, VD1-2, ..., VD1-$m$, respectively, and the data length LENG included in the configuration record corresponding to the first verification data VD1 may include first through m-th data lengths LENG1-1, LENG1-2, ..., LENG1-$m$ corresponding to the first through m-th block verification data VD1-1, VD1-2, ..., VD1-$m$, respectively.

In this case, as illustrated in FIG. 16, the hash type information HTYPE1 corresponding to the first verification data VD1, the first start address SADDR1-1 and the first data length LENG1-1 corresponding to the first block verification data VD1-1, the second start address SADDR1-2 and the second data length LENG1-2 corresponding to the second block verification data VD1-2, the m-th start address SADDR1-$m$ and the m-th data length LENG1-$m$ corresponding to the m-th block verification data VD1-$m$, and the reference hash value RHASH1 corresponding to the first verification data VD1 may be successively stored in a descriptor table 510$b$ as the configuration record corresponding to the first verification data VD1.

In this case, the control unit 610 may successively output each of the first through m-th start addresses SADDR1-1, SADDR1-2, ..., SADDR1-$m$ and each of the first through m-th data lengths LENG1-1, LENG1-2, ..., LENG1-$m$, which are included in the selected configuration record that is stored in the configuration record register 617, in pairs.

The DMA unit 620 may successively read the first through m-th block verification data VD1-1, VD1-2, ..., VD1-$m$, which correspond to pairs of the first through m-th start addresses SADDR1-1, SADDR1-2, ..., SADDR1-$m$ and the first through m-th data lengths LENG1-1, LENG1-2, ..., LENG1-$m$, respectively, from the memory device 500, and store the first through m-th block verification data VD1-1, VD1-2, ..., VD1-$m$ in the FIFO memory unit 630.

The hash engine 640 may successively perform a hash operation, which corresponds to the hash type information HTYPE1, on each of the first through m-th block verification data VD1-1, VD1-2, ..., VD1-$m$ stored in the FIFO memory unit 630 to generate the verification hash value VHASH. For example, the hash engine 640 may successively read the first through m-th block verification data VD1-1, VD1-2, ..., VD1-$m$ from the FIFO memory unit 630, and successively perform the hash operation corresponding to the hash type information HTYPE1 on the first through m-th block verification data VD1-1, VD1-2, ..., VD1-$m$ based on the first through m-th data lengths LENG1-1, LENG1-2, ..., LENG1-$m$, respectively, to generate the verification hash value VHASH.

In some example embodiments, a size of the FIFO memory unit 630 may be smaller than a size of the p-th block verification data VD1-*p*. The hash engine 640 may read the p-th block verification data VD1-*p* from the FIFO memory unit 630 and perform the hash operation on the p-th block verification data VD1-*p* at the same time as the DMA unit 620 stores the p-th block verification data VD1-*p* in the FIFO memory unit 630. Therefore, the FIFO memory unit 630 may store only a part of the p-th block verification data VD1-*p* at any time while the DMA unit 620 stores the p-th block verification data VD1-*p* in the FIFO memory unit 630 and the hash engine 640 reads the p-th block verification data VD1-*p* from the FIFO memory unit 630 and performs the hash operation on the p-th block verification data VD1-*p*.

As described above, even in the case that the first verification data VD1 is distributed in the memory device 500 as the first through m-th block verification data VD1-1, VD1-2, . . . , VD1-*m*, the descriptor table 510*b* may not store reference hash values for each of the first through m-th block verification data VD1-1, VD1-2, . . . , VD1-*m* and store one reference hash value RHASH corresponding to the first verification data VD1. Therefore, a size of the descriptor table 510*b* may be reduced.

As described above with reference to FIGS. 9 to 16, the CPU 400 included in the electronic system 20 generates the descriptor table 510 including the plurality of configuration records that correspond to the plurality of verification data VD1, VD2, . . . , VDn stored in the memory device 500, and stores the descriptor table 510 in the memory device 500. In addition, the CPU 400 provides the descriptor record DR corresponding to the descriptor table 510 to the integrity verification device 600 that is implemented as a hardware device. The integrity verification device 600 stores the descriptor record DR received from the CPU 400 in an internal register. Subsequently, the integrity verification device 600 performs the integrity verification operation on the descriptor table 510 and performs the integrity verification operation on one of the plurality of verification data VD1, VD2, . . . , VDn alternately in the background while the electronic system 20 operates. The integrity verification device 600 provides the interrupt signal INT to the CPU 400 when detecting a change of the descriptor table 510 or a change of the plurality of verification data VD1, VD2, . . . , VDn. Therefore, the electronic system 20 effectively detects a damage of data stored in the memory device 500.

Figure 17:
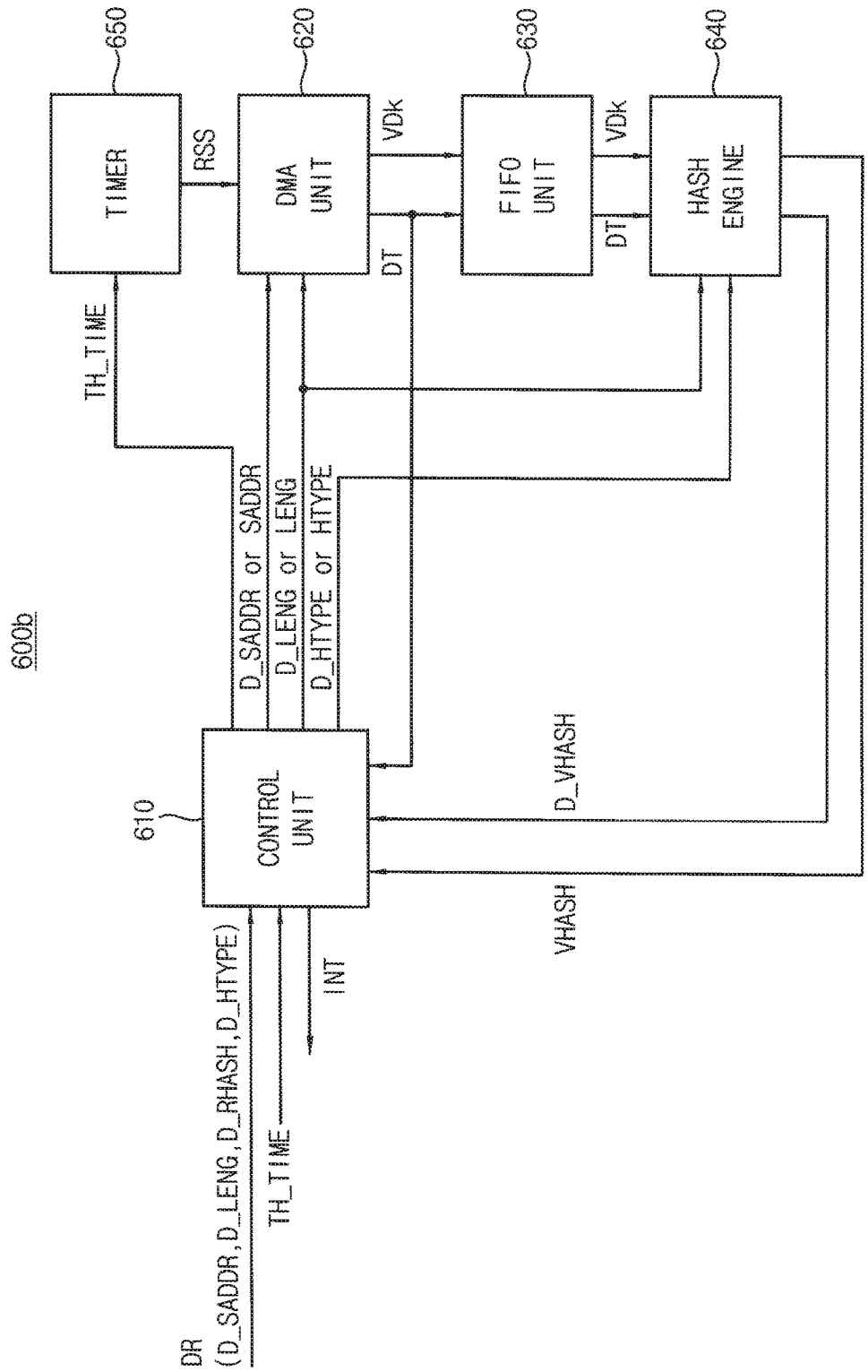
FIG. 17 is a block diagram illustrating an example of an integrity verification device included in an electronic system of FIG. 9, according to another exemplary embodiment.

FIG. 17 is a block diagram illustrating an example of an integrity verification device 600*b* included in an electronic system 20 of FIG. 9, according to another exemplary embodiment.

Referring to FIG. 17, an integrity verification device 600*b* may include a control unit 610, a DMA unit 620, a FIFO memory unit 630, a hash engine 640, and a timer 650.

The integrity verification device 600*b* of FIG. 17 may be the same as or similar to the integrity verification device 600*a* of FIG. 11 except that the integrity verification device 600*b* of FIG. 17 further includes the timer 650.

The timer 650 may generate a read start signal RSS at every threshold time interval TH_TIME.

When the DMA unit 620 receives the read start signal RSS from the timer 650, the DMA unit 620 may perform a burst read operation on the memory device 500 to read the descriptor table 510 or the verification data VDk from the memory device 500.

For example, the DMA unit 620 may perform the burst read operation on the memory device 500 based on the read start signal RSS according to the timing diagram of FIG. 8.

As illustrated in FIG. 8, since the DMA unit 620 performs the burst read operation one time on the memory device 500 to read the descriptor table 510 or the verification data VDk when the DMA unit 620 receives the read start signal RSS from the timer 650, an access frequency of the DMA unit 620 to the memory device 500 may be adjusted based on the threshold time interval TH_TIME.

In one or more exemplary embodiments, the CPU 400 may provide a value of the threshold time interval TH_TIME to the control unit 610, the control unit 610 may provide the value of the threshold time interval TH_TIME to the timer 650, and the timer 650 may generate the read start signal RSS at every threshold time interval TH_TIME. Therefore, the CPU 400 may control the access frequency of the integrity verification device 600 to the memory device 500 to perform the integrity verification operation by adjusting the threshold time interval TH_TIME. As such, the CPU 400 may increase a security level of the electronic system 20 by decreasing the threshold time interval TH_TIME, and decrease power consumption of the electronic system 20 by increasing the threshold time interval TH_TIME.

Although an operation of the electronic system 20 to perform the integrity verification operation on the plurality of verification data VD1, VD2, . . . , VDn stored in the memory device 500 is described with reference to FIGS. 9 to 17, it is understood that one or more other exemplary embodiments are not limited thereto. For example, according to another exemplary embodiment, the memory device 500 may store one verification data. In this case, the electronic system 20 may repeatedly perform the integrity verification operation on the one verification data to generate the interrupt signal INT.

Figure 18:
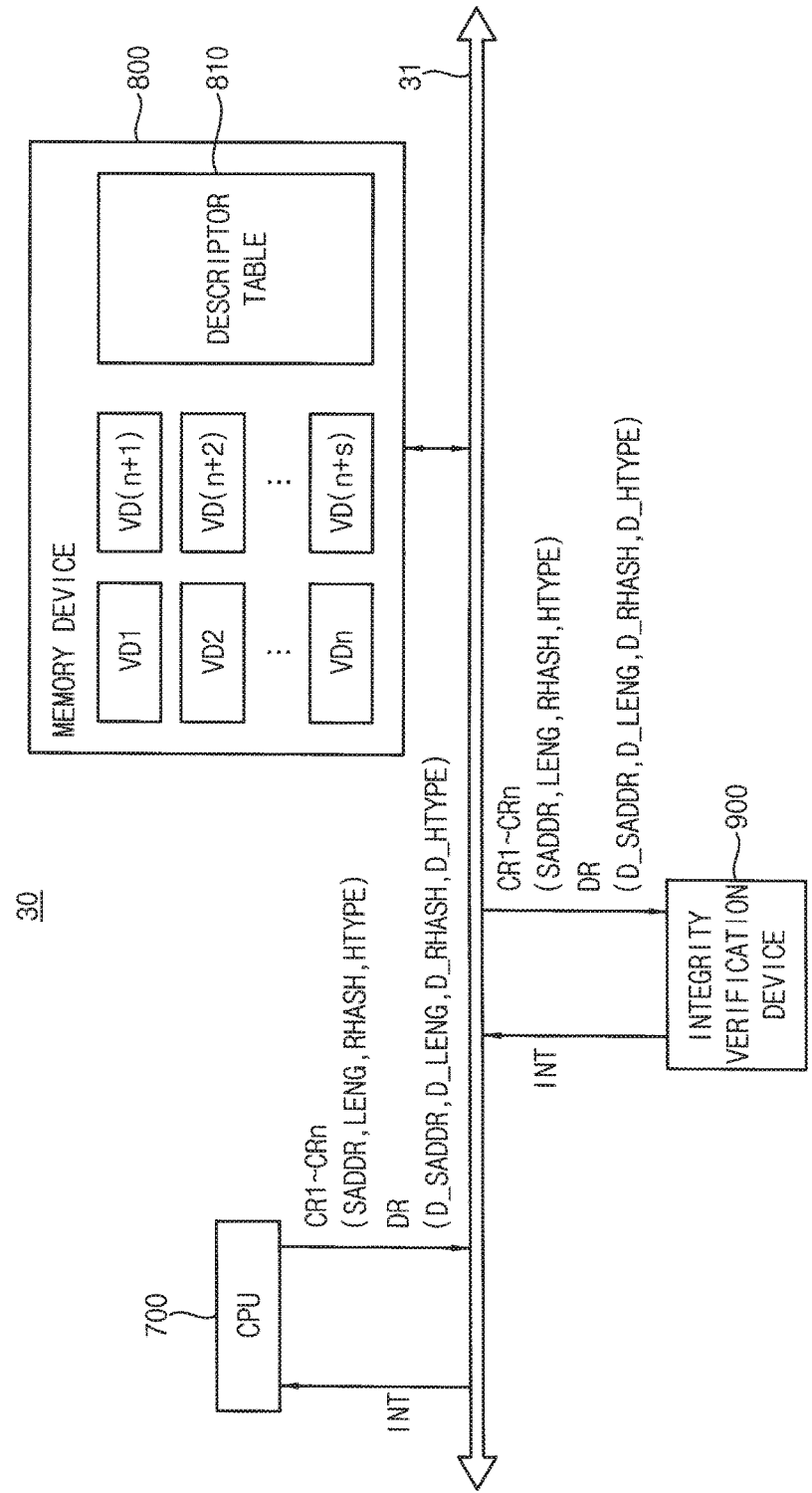
FIG. 18 is a block diagram illustrating an electronic system according to yet another exemplary embodiment.

FIG. 18 is a block diagram illustrating an electronic system 30 according to yet another exemplary embodiment.

An electronic system 30 of FIG. 18 corresponds to a combination of aspects of the electronic system 10 of FIG. 1 and aspects of the electronic system 20 of FIG. 9.

Referring to FIG. 18, the electronic system 30 includes a processor (in the present exemplary embodiment, a CPU 700), a memory device 800, and an integrity verification device 900.

The CPU 700, the memory device 800, and the integrity verification device 900 communicate with each other via an internal bus 31.

The memory device 800 may include a memory controller to communicate data with the CPU 700 and the integrity verification device 900.

The memory device 800 stores a plurality of verification data VD1, VD2, . . . , VDn, VD(n+1), VD(n+2), . . . , VD(n+s). Here, n and s represent positive integers.

The CPU 700 generates a plurality of configuration records CR1~CR(n+s), each of which includes the start address SADDR, the data length LENG, the reference hash value RHASH, and the hash type information HTYPE corresponding to each of the plurality of verification data VD1, VD2, . . . , VDn, VD(n+1), VD(n+2), . . . , VD(n+s) that are stored in the memory device 800.

The CPU 700 provides the plurality of configuration records CR1~CRn, which are a part of the plurality of configuration records CR1~CR(n+s), to the integrity verification device 900.

The CPU 700 generates a descriptor table 810 including the plurality of configuration records CR(n+1)~CR(n+s), and stores the descriptor table 810 in the memory device 800. The CPU 700 generates a descriptor record DR including the descriptor start address D_SADDR, the descriptor length D_LENG, the descriptor reference hash value D_RHASH, and the descriptor hash type information D_HTYPE corresponding to the descriptor table 810, and provides the descriptor record DR to the integrity verification device 900.

The integrity verification device 900 internally stores the plurality of configuration records CR1~CRn and the descriptor record DR received from the CPU 700.

The integrity verification device 900 circularly selects each of the plurality of configuration records CR1~CRn, performs the integrity verification operation on the verification data VDk corresponding to the selected configuration record CRk, and provides an interrupt signal INT to the CPU 700 based on a result of the integrity verification operation. The operation of the integrity verification device 900 to successively perform the integrity verification operation on each of the plurality of verification data VD1, VD2, . . . , VDn based on the plurality of configuration records CR1~CRn may be substantially the same as or similar to the operation of the integrity verification device 300 included in the electronic system 10 of FIG. 1.

After the integrity verification device 900 finishes the integrity verification operation on the plurality of verification data VD1, VD2, . . . , VDn based on the plurality of configuration records CR1~CRn, the integrity verification device 900 performs the integrity verification operation on the descriptor table 810 based on the descriptor record DR and performs the integrity verification operation on one of the plurality of verification data VD(n+1), VD(n+2), . . . , VD(n+s) based on one of the plurality of configuration records CR(n+1)~CR(n+s), which are included in the descriptor table 810, alternately. The integrity verification device 900 provides the interrupt signal INT to the CPU 700 based on a result of the integrity verification operation. The operation of the integrity verification device 900 to alternately perform the integrity verification operation on the descriptor table 810 and on each of the plurality of verification data VD(n+1), VD(n+2), . . . , VD(n+s) based on the descriptor record DR may be substantially the same as or similar to the operation of the integrity verification device 600 included in the electronic system 20 of FIG. 9.

After the integrity verification device 900 finishes the integrity verification operation on the plurality of verification data VD(n+1), VD(n+2), . . . , VD(n+s) based on the descriptor record DR, the integrity verification device 900 may perform the integrity verification operation again on the plurality of verification data VD1, VD2, . . . , VDn based on the plurality of configuration records CR1~CRn.

As described above, the integrity verification device 900 may perform the integrity verification operation on the plurality of verification data VD1, VD2, . . . , VDn based on the plurality of configuration records CR1~CRn, and perform the integrity verification operation on the plurality of verification data VD(n+1), VD(n+2), . . . , VD(n+s) based on the descriptor record DR alternately.

Figure 19:
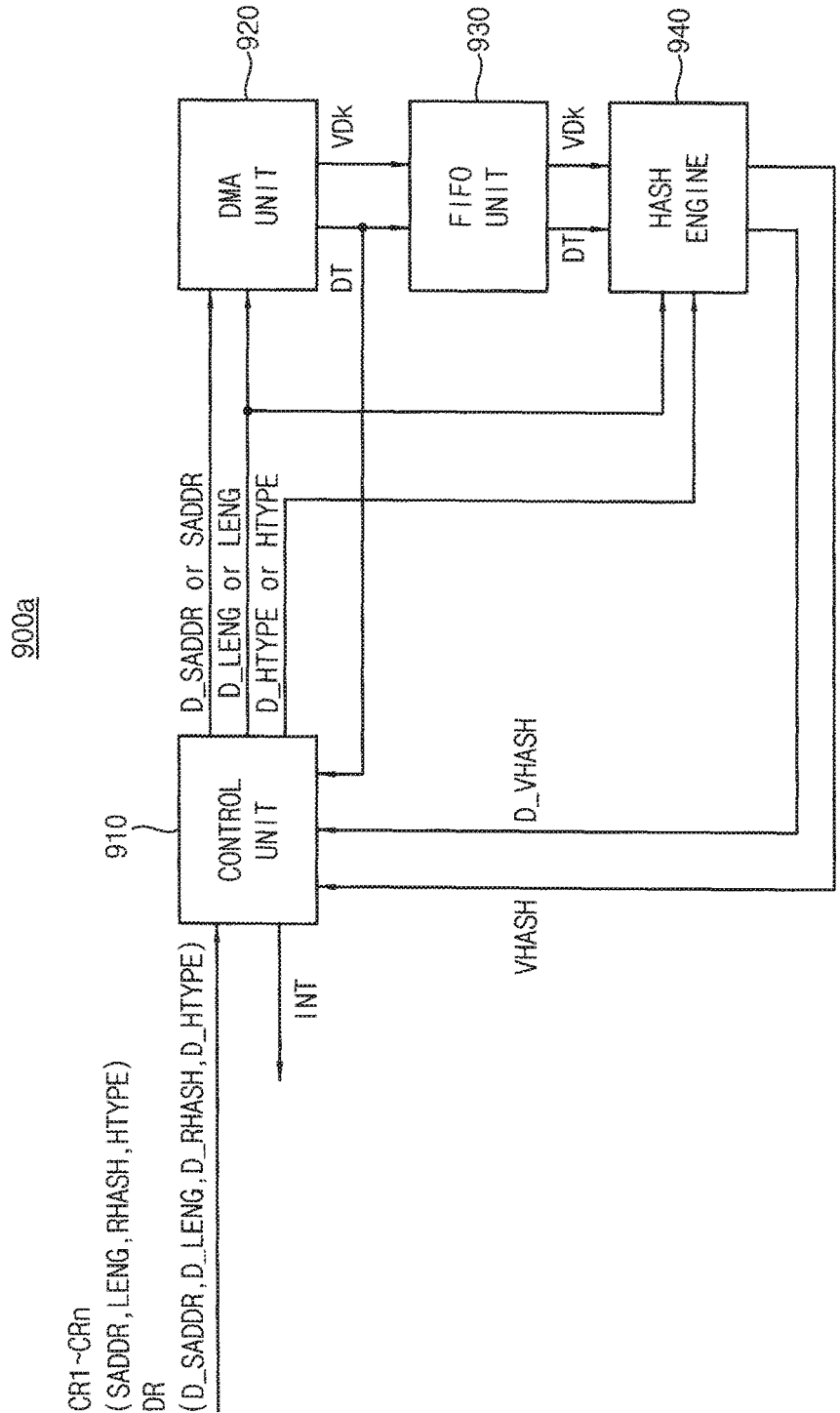
FIG. 19 is a block diagram illustrating an example of an integrity verification device included in an electronic system of FIG. 18, according to an exemplary embodiment.
Figure 20:
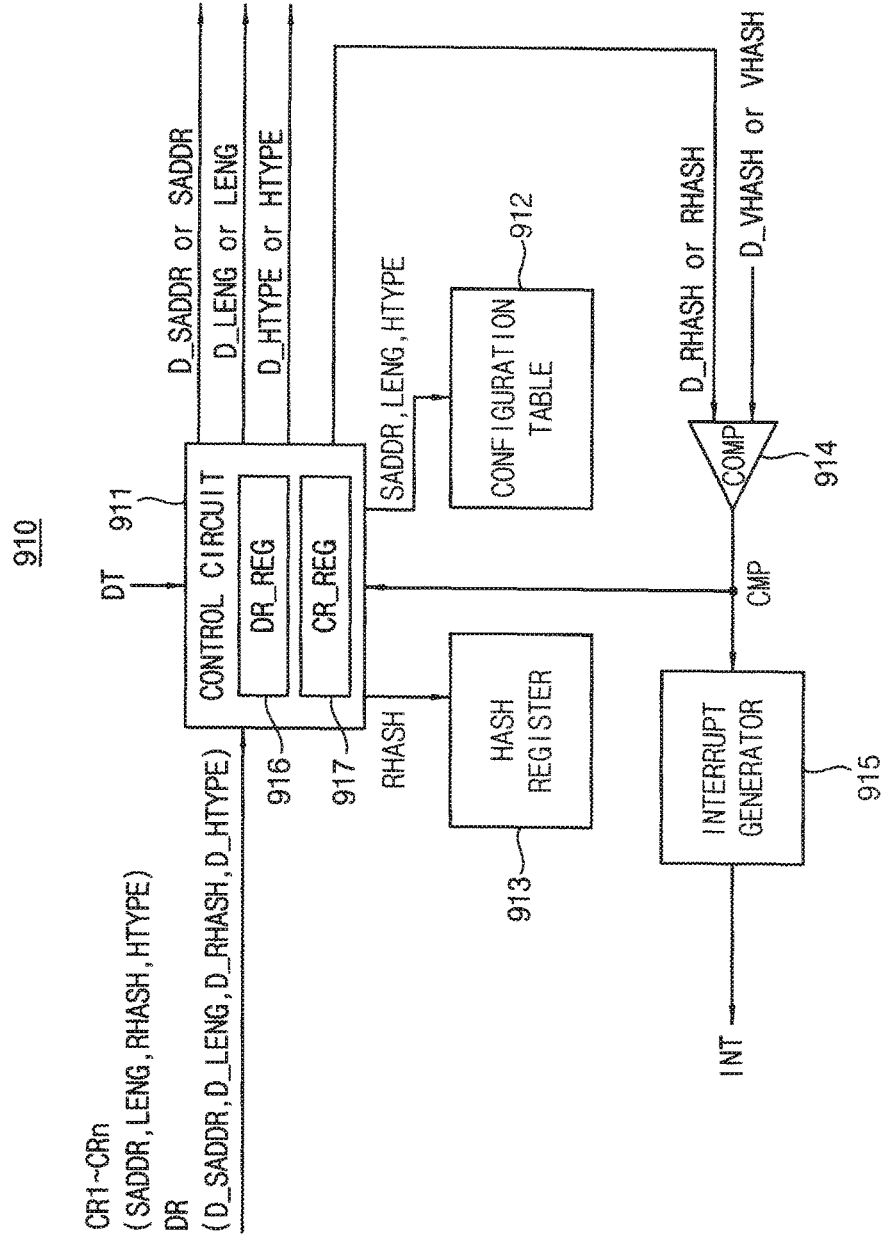
FIG. 20 is a block diagram illustrating an example of a control unit included in an integrity verification device of FIG. 18.

FIG. 19 is a block diagram illustrating an example of an integrity verification device 900a included in an electronic system 30 of FIG. 18, according to an exemplary embodiment, and FIG. 20 is a block diagram illustrating an example of a control unit 910 included in an integrity verification device 900a of FIG. 18.

Referring to FIGS. 19 and 20, an integrity verification device 900a may include a control unit 910, a DMA unit 920, a FIFO memory unit 930, and a hash engine 940.

The control unit 910 may include a control circuit 911, a configuration table 912, a hash register 913, a comparator COMP 914, and an interrupt generator 915.

The control circuit 911 may include a descriptor record register DR_REG 916 and a configuration record register CR_REG 917.

The configuration table 912 and the hash register 913 included in the integrity verification device 900a may be substantially the same as or similar to the configuration table 312 and the hash register 313, respectively, included in the integrity verification device 300a. The descriptor record register 916 and the configuration record register 917 included in the integrity verification device 900a may be substantially the same as or similar to the descriptor record register 616 and the configuration record register 617, respectively, included in the integrity verification device 600a.

The control circuit 911 included in the integrity verification device 900a may correspond to a combination of aspects of the control circuit 311 included in the integrity verification device 300a and aspects of the control circuit 611 included in the integrity verification device 600a. The comparator 914 included in the integrity verification device 900a may correspond to a combination of aspects of the comparator 314 included in the integrity verification device 300a and aspects of the comparator 614 included in the integrity verification device 600a. The interrupt generator 915 included in the integrity verification device 900a may correspond to a combination of aspects of the interrupt generator 315 included in the integrity verification device 300a and aspects of the interrupt generator 615 included in the integrity verification device 600a.

Therefore, the control unit 910 included in the integrity verification device 900a may correspond to a combination of aspects of the control unit 310 included in the integrity verification device 300a and aspects of the control unit 610 included in the integrity verification device 600a. The DMA unit 920 included in the integrity verification device 900a may correspond to a combination of aspects of the DMA unit 320 included in the integrity verification device 300a and aspects of the DMA unit 620 included in the integrity verification device 600a. The FIFO memory unit 930 included in the integrity verification device 900a may correspond to a combination of aspects of the FIFO memory unit 330 included in the integrity verification device 300a and aspects of the FIFO memory unit 630 included in the integrity verification device 600a. The hash engine 940 included in the integrity verification device 900a may correspond to a combination of aspects of the hash engine 340 included in the integrity verification device 300a and aspects of the hash engine 640 included in the integrity verification device 600a.

Structures and operations of the electronic system 10 of FIG. 1 and the electronic system 20 of FIG. 9 are described above with reference to FIGS. 1 to 17. Therefore, a redundant description of the electronic system 30 of FIG. 18 is omitted below.

As described above with reference to FIGS. 1 to 20, since the integrity verification device 900 is a hardware device, a size of storage area included in the integrity verification device 900 may be fixed. Therefore, a number of the plurality of configuration records CR1~CRn that are able to be stored in the integrity verification device 900 may be limited.

However, although the plurality of verification data VD1, VD2, . . . , VDn, VD(n+1), VD(n+2), . . . , VD(n+s) are stored in the memory device 800, the plurality of configuration records CR1~CRn, which correspond to the plurality of verification data VD1, VD2, . . . , VDn, are stored in the integrity verification device 900 internally while the plurality of configuration records CR(n+1)~CR(n+s), which correspond to the plurality of verification data VD(n+1), VD(n+2), . . . , VD(n+s), are stored in the memory device 800 as the descriptor table 810. That is, the integrity verification device 900 internally stores the descriptor record DR corresponding to the descriptor table 810 instead of the plurality of configuration records CR(n+1)~CR(n+s).

Therefore, a number of the plurality of verification data on which the electronic system 30 is able to perform the integrity verification operation may not be limited by a size of the internal register included in the integrity verification device 900. That is, the number of the plurality of verification data on which the electronic system 30 is able to perform the integrity verification operation may increase regardless of the size of the internal register included in the integrity verification device 900.

Figure 21:
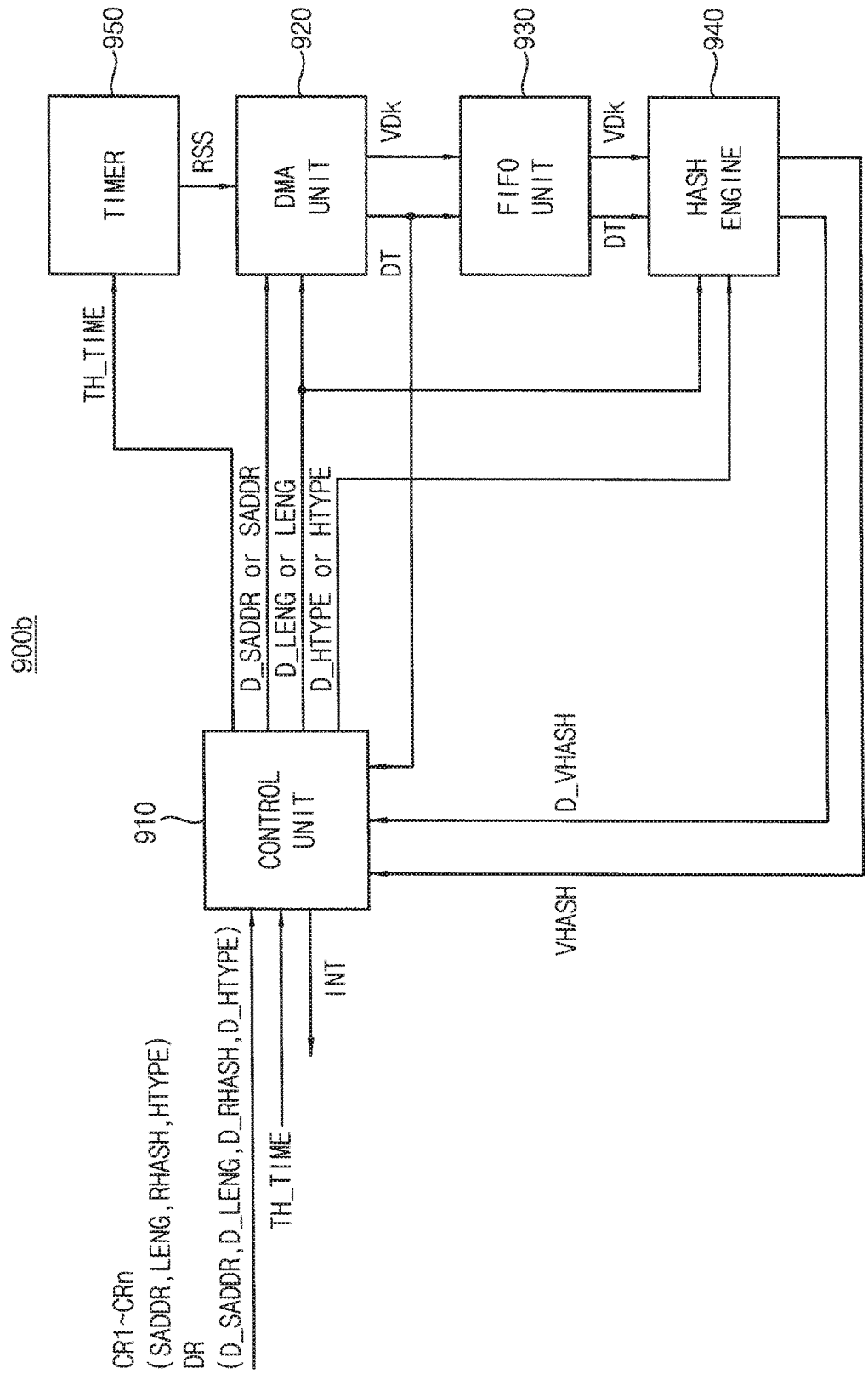
FIG. 21 is a block diagram illustrating an example of an integrity verification device included in an electronic system of FIG. 18, according to another exemplary embodiment.

FIG. 21 is a block diagram illustrating an example of an integrity verification device 900*b* included in an electronic system 30 of FIG. 18, according to another exemplary embodiment.

Referring to FIG. 21, an integrity verification device 900*b* may include a control unit 910, a DMA unit 920, a FIFO memory unit 930, a hash engine 940, and a timer 950.

The integrity verification device 900*b* of FIG. 21 may be the same as or similar to the integrity verification device 900*a* of FIG. 19 except that the integrity verification device 900*b* of FIG. 21 further includes the timer 950.

The timer 950 may generate a read start signal RSS at every threshold time interval TH_TIME.

When the DMA unit 920 receives the read start signal RSS from the timer 950, the DMA unit 920 may perform a burst read operation on the memory device 800 to read the descriptor table 810 or the verification data VDk from the memory device 800.

For example, the DMA unit 920 may perform the burst read operation on the memory device 800 based on the read start signal RSS according to the timing diagram of FIG. 8.

As illustrated in FIG. 8, since the DMA unit 920 performs the burst read operation one time on the memory device 800 to read the descriptor table 810 or the verification data VDk when the DMA unit 920 receives the read start signal RSS from the timer 950, an access frequency of the DMA unit 920 to the memory device 800 may be adjusted based on the threshold time interval TH_TIME.

In one or more exemplary embodiments, the CPU 700 may provide a value of the threshold time interval TH_TIME to the control unit 910, the control unit 910 may provide the value of the threshold time interval TH_TIME to the timer 950, and the timer 950 may generate the read start signal RSS at every threshold time interval TH_TIME. Therefore, the CPU 700 may control the access frequency of the integrity verification device 900 to the memory device 800 to perform the integrity verification operation by adjusting the threshold time interval TH_TIME. As such, the CPU 700 may increase a security level of the electronic system 30 by decreasing the threshold time interval TH_TIME, and decrease power consumption of the electronic system 30 by increasing the threshold time interval TH_TIME.

Although an operation of the electronic system 30 to perform the integrity verification operation on the plurality of verification data VD1, VD2, . . . , VDn and on the plurality of verification data VD(n+1), VD(n+2), . . . , VD(n+s) stored in the memory device 800 is described with reference to FIGS. 18 to 21, it is understood that one or more other exemplary embodiments are not limited thereto. For example, according to another exemplary embodiment, n and s may be one. That is, the memory device 800 may store two verification data. In this case, the electronic system 30 may perform the integrity verification operation on the two verification data alternately to generate the interrupt signal INT.

Figure 22:
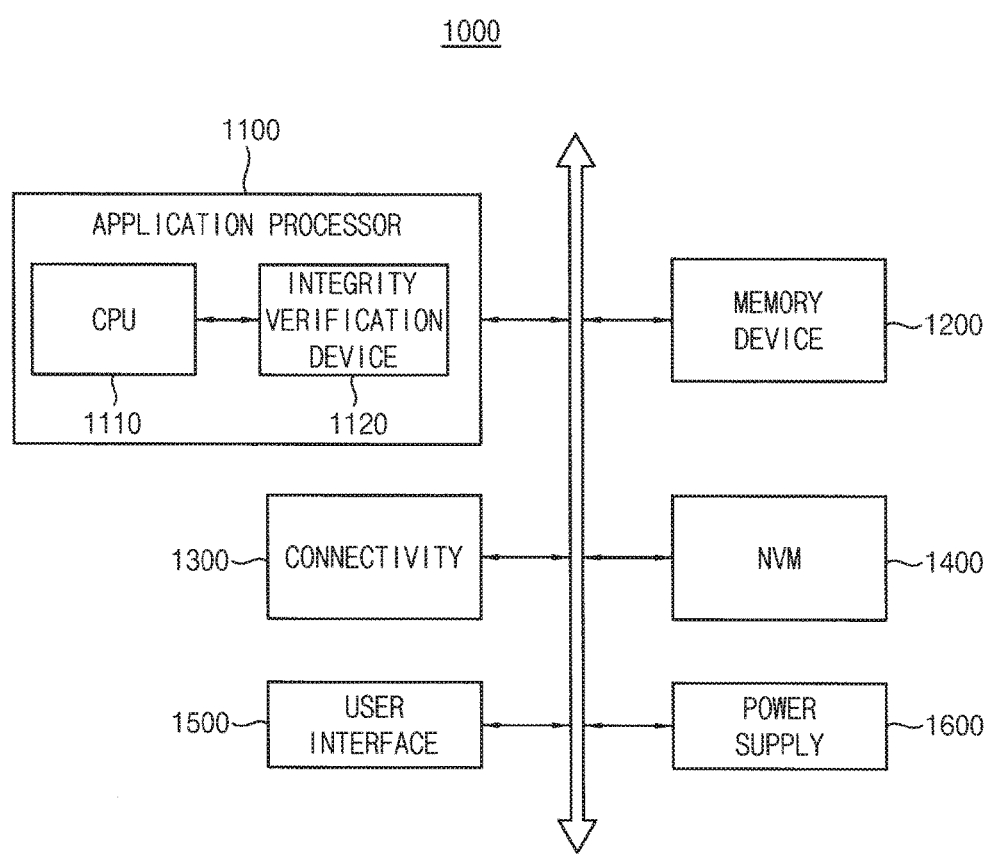
FIG. 22 is a block diagram illustrating a mobile system according to an exemplary embodiment.

FIG. 22 is a block diagram illustrating a mobile system 1000 according to an exemplary embodiment.

Referring to FIG. 22, a mobile system 1000 includes an application processor 1100, a memory device 1200, a connectivity unit 1300 (e.g., connector), a nonvolatile memory device NVM 1400, a user interface 1500, and a power supply 1600. In one or more exemplary embodiments, the mobile system 1000 may be a mobile phone, a smart phone, a personal digital assistant (PDA), a portable multimedia player (PMP), a digital camera, a music player, a portable game console, a navigation system, a tablet device, a wearable smart device, etc.

The application processor 1100 may execute applications, such as a web browser, a game application, a video player, etc. In one or more exemplary embodiments, the application processor 1100 may include a single core or multiple cores. For example, the application processor 1100 may be a multi-core processor, such as a dual-core processor, a quad-core processor, a hexa-core processor, etc. The application processor 1100 may include an internal cache memory or an external cache memory.

The memory device 1200 may store data processed by the application processor 1100, or may operate as a working memory.

The application processor 1100 includes a CPU 1110 and an integrity verification device 1120. The integrity verification device 1120 may be a hardware device. The CPU 1110 determines a plurality of verification data among data stored in the memory device 1200, and provides an address and a hash value corresponding to each of the plurality of verification data to the integrity verification device 1120. The integrity verification device 1120 directly accesses the memory device 1200 without intervention of the CPU 1110 and reads each of the plurality of verification data from the memory device 1200 based on the address received from the CPU 1110. The integrity verification device 1120 performs a hash operation on each of the plurality of verification data using a hardware engine to generate (e.g., obtain) a verification hash value, and determines whether each of the plurality of verification data has integrity based on the generated verification hash value and the hash value received from the CPU 1110. When the integrity verification device 1120 determines that one of the plurality of verification data does not have integrity, the integrity verification device 1120 provides an interrupt signal to the CPU 1110.

The CPU 1110, the integrity verification device 1120, and the memory device 1200 may be implemented with one of the electronic system 10 of FIG. 1, the electronic system 20 of FIG. 9, and the electronic system 30 of FIG. 18. Structures and operations of the electronic system 10 of FIG. 1, the electronic system 20 of FIG. 9, and the electronic system 30 of FIG. 18 are described above with reference to FIGS. 1 to 21. Therefore, a redundant description of the CPU 1110, the integrity verification device 1120 and the memory device 1200 is omitted below.

The connectivity unit 1300 may perform wired or wireless communication with an external device. For example, the connectivity unit 1300 may perform Ethernet communication, local area wireless communication, near field communication (NFC), radio frequency identification (RFID) communication, mobile telecommunication, memory card communication, universal serial bus (USB) communication, etc. In one or more exemplary embodiments, the connectivity unit 1300 may include a baseband chipset that supports communications, such as global system for mobile communications (GSM), general packet radio service (GPRS), wideband code division multiple access (WCDMA), high speed downlink/uplink packet access (HSxPA), etc.

The nonvolatile memory device 1400 may store a boot image for booting the mobile system 1000. For example, the nonvolatile memory device 1400 may be an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), etc.

The user interface 1500 may include at least one input device, such as a keypad, a touch screen, etc., and at least one output device, such as a speaker, a display device, etc. The power supply 1600 may supply a power supply voltage to the mobile system 1000.

In one or more exemplary embodiments, the mobile system 1000 may further include an image processor and/or a storage device, such as a memory card, a solid state drive (SSD), etc.

In one or more exemplary embodiments, the mobile system 1000 and/or components of the mobile system 1000 may be packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi chip package (MCP), wafer-level fabricated package (WFP), or wafer-level processed stack package (WSP).

While not restricted thereto, an exemplary embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs. Moreover, it is understood that in exemplary embodiments, one or more units or components of the above-described apparatuses and devices can include circuitry, a processor, a microprocessor, etc., and may execute a computer program stored in a computer-readable medium.

The foregoing is illustrative of exemplary embodiments and is not to be construed as limiting thereof. Although a few exemplary embodiments have been described, those skilled in the art will readily appreciate that many modifications are possible in exemplary embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various exemplary embodiments and is not to be construed as limited to the specific exemplary embodiments disclosed, and that modifications to the disclosed exemplary embodiments, as well as other exemplary embodiments, are intended to be included within the scope of the appended claims.

What is claimed is:

1. A method of performing an integrity verification operation by a hardware-implemented integrity verification device of an electronic system including the hardware-implemented integrity verification device, the method comprising:
   directly accessing, by the hardware-implemented integrity verification device, a memory device to read verification data among a plurality of verification data stored in the memory device, the memory device connected to the hardware-implemented integrity verification device;
   performing, by the hardware-implemented integrity verification device, a hash operation on the read verification data to obtain a verification hash value;
   reading, by the hardware-implemented integrity verification device, a descriptor table from the memory device based on a descriptor start address and a descriptor length in a descriptor record;
   performing, by the hardware-implemented integrity verification device, a hash operation on the descriptor table based on the descriptor length to obtain a descriptor verification hash value; and
   comparing, by the hardware-implemented integrity verification device, the verification hash value and a reference hash value to selectively output an interrupt signal to an external device based on a comparison result,
   wherein outputting of the interrupt signal is dependent on the descriptor verification hash value being different from a descriptor reference hash value in the descriptor record.

2. The method of claim 1, further comprising storing, by the hardware-implemented integrity verification device, a plurality of configuration records corresponding to the plurality of verification data.

3. The method of claim 1, further comprising:
   outputting the interrupt signal to the external device in response to the verification hash value being different from the reference hash value.

4. The method of claim 1, wherein the reference hash value is stored in a hash register in the hardware-implemented integrity verification device.

5. The method of claim 1, further comprising:
   generating, by a timer in the hardware-implemented integrity verification device, a read start signal at every threshold time interval.

6. The method of claim 1, wherein the hash operation includes a Secure Hash Algorithm (SHA)-1 operation, a SHA-256 operation, a SHA-384 operation, or a SHA-512 operation.

7. A hardware-implemented integrity verification device for an electronic system, the hardware-implemented integrity verification device comprising:
   a direct memory accessor (DMA) configured to directly access a memory device to read verification data among a plurality of verification data stored in the memory device;

a hash engine configured to perform a hash operation on the read verification data to obtain a verification hash value, wherein the DMA is further configured to read a descriptor table from the memory device based on a descriptor start address and a descriptor length in a descriptor record, and the hash engine is further configured to perform a hash operation on the descriptor table based on the descriptor length to obtain a descriptor verification hash value;

a controller configured to compare the verification hash value and a reference hash value, and to selectively output an interrupt signal to an external device based on a comparison result, wherein outputting of the interrupt signal is also dependent on the descriptor verification hash value being different from a descriptor reference hash value in the descriptor record, the descriptor reference hash value corresponding to the descriptor table.

8. The hardware-implemented integrity verification device of claim 7, wherein when the verification hash value is different from the reference hash value, the controller outputs the interrupt signal to the external device.

9. The hardware-implemented integrity verification device of claim 7, wherein the controller includes a hash register configured to store the reference hash value.

10. The hardware-implemented integrity verification device of claim 7, further comprising a timer configured to generate a read start signal at every threshold time interval.

11. The integrity verification device of claim 7, wherein the controller is configured to select, in response to the descriptor verification hash value being the same as the descriptor reference hash value, a configuration record and output a start address from the configuration record and a data length from the configuration record.

12. The integrity verification device of claim 11, wherein:
the verification data comprises first through m-th block verification data distributed in the memory device, where m is an integer equal to or greater than two; and
the start address in the configuration record comprises first through m-th start addresses corresponding to the first through m-th block verification data, respectively, and the data length in the configuration record comprises first through m-th data lengths corresponding to the first through m-th block verification data, respectively.

13. The integrity verification device of claim 12, further comprising:
a first-input first-output (FIFO) memory,
wherein the controller is configured to successively output each of the first through m-th start addresses and each of the first through m-th data lengths, in pairs, wherein the DMA successively reads the first through m-th block verification data, which correspond to pairs of the first through m-th start addresses and the first through m-th data lengths, respectively, from the memory device, and stores the first through m-th block verification data, which are read from the memory device, in the FIFO memory, and wherein the hash engine obtains a first interim hash value based on the first block verification data and the first data length, obtains a p-th interim hash value based on p-th block verification data, first through p-th data lengths and a (p−1)-th interim hash value, and obtains the verification hash value based on the m-th block verification data, the first through m-th data lengths, and an (m−1)-th interim hash value, where p is a positive integer less than m.

14. The integrity verification device of claim 7, wherein the hash engine is configured to perform the hash operation, selected from a various types of hash operations, on the corresponding verification data to obtain the verification hash value.

15. An electronic device, comprising:
a processor configured to communicate with a memory device via a bus; and
a hardware-implemented integrity verification device configured to:
directly access the memory device to read verification data without intervention of the processor via the bus among a plurality of verification data stored in the memory device,
perform a hash operation using a hardware engine on the read verification data to obtain a verification hash value,
read a descriptor table from the memory device based on a descriptor start address and a descriptor length in a descriptor record;
perform a hash operation on the descriptor table based on the descriptor length to obtain a descriptor verification hash value; and
compare the verification hash value and a reference hash value, and to selectively output an interrupt to the processor based on a comparison result, wherein the outputting of the interrupt signal is also dependent on the descriptor verification hash value being different from a descriptor reference hash value in the descriptor record, the descriptor reference hash value corresponding to the descriptor table.

16. The electronic device of claim 15, further comprising a timer configured to generate a read start signal at every threshold time interval.

* * * * *